(12) United States Patent
Schmidt

(10) Patent No.: US 9,009,681 B2
(45) Date of Patent: Apr. 14, 2015

(54) OBTAINING PROFILE DATA FOR USE IN OPTIMIZING COMPUTER PROGRAMMING CODE

(75) Inventor: William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/593,248

(22) Filed: Aug. 23, 2012

(65) Prior Publication Data

US 2012/0317553 A1 Dec. 13, 2012

Related U.S. Application Data

(60) Division of application No. 12/099,873, filed on Apr. 9, 2008, now Pat. No. 8,271,960, which is a continuation of application No. 10/406,552, filed on Apr. 3, 2003, now Pat. No. 7,386,838.

(51) Int. Cl.
*G06F 9/44* (2006.01)
*G06F 9/45* (2006.01)

(52) U.S. Cl.
CPC ...................................... *G06F 8/443* (2013.01)

(58) Field of Classification Search
None
See application file for complete search history.

(56) References Cited

U.S. PATENT DOCUMENTS

| | | | |
|---|---|---|---|
| 5,768,592 A | 6/1998 | Chang | |
| 5,790,858 A | 8/1998 | Vogel | |
| 5,950,009 A | 9/1999 | Bortnikov et al. | |
| 5,978,588 A | 11/1999 | Wallace | |
| 6,070,009 A | 5/2000 | Dean et al. | |
| 6,151,706 A | 11/2000 | Lo et al. | |
| 6,170,083 B1 | 1/2001 | Adl-Tabatabai | |
| 6,189,141 B1 | 2/2001 | Benitez et al. | |
| 6,327,699 B1 | 12/2001 | Larus et al. | |
| 6,625,797 B1 | 9/2003 | Edwards et al. | |
| 6,631,518 B1 | 10/2003 | Bortnikov et al. | |
| 6,668,372 B1 | 12/2003 | Wu | |

(Continued)

OTHER PUBLICATIONS

Schmidt et al, "Profile-directed restructuring of operating system code", 1998, IBM Systems Journal, vol. 37, No. 2.*

(Continued)

*Primary Examiner* — Lewis A Bullock, Jr.
*Assistant Examiner* — Christine Dang
(74) *Attorney, Agent, or Firm* — Roy W. Truelson

(57) ABSTRACT

Program execution profile data is collected by direct measurement of some code paths, and by inferring data for unmeasured paths. The data collection process may cause errors, which are propagated by the inferencing process. The profile data thus constructed is further enhanced by detecting certain data mismatches, and adjusting inferred data to reduce the scope of errors propagated during the inferencing process. Preferably, a control flow graph of the program being measured is constructed. Mismatches in the total weights of input arcs versus output arcs are detected. For certain specific types of mismatches, it can be known or guessed which count is incorrect, and this count is accordingly corrected. Correction of arc counts proceeds recursively until it is no longer possible to correct mismatches. Additionally, certain other conditions are adjusted as presumed inaccuracies.

8 Claims, 17 Drawing Sheets

(56) References Cited

U.S. PATENT DOCUMENTS

| | | |
|---|---|---|
| 6,848,100 B1 | 1/2005 | Wu et al. |
| 6,938,249 B2 | 8/2005 | Roediger et al. |
| 7,073,166 B2 | 7/2006 | Bera |
| 7,086,043 B2 | 8/2006 | Roediger et al. |
| 2003/0051234 A1 | 3/2003 | Schmidt |
| 2004/0193815 A1 | 9/2004 | Haghighat et al. |

OTHER PUBLICATIONS

W. J. Schmidt et al., "Profile-Directed Restructuring of Operating System Code", IBM Systems Journal, vol. 37, No. 2, pp. 270-297 (1998). Note: This reference was cited in U.S. Appl. No. 10/406,552, filed Apr. 3, 2003, now issued as U.S. Patent 7,386,838, which is relied upon for priority herein under 35 U.S.C. 120.

* cited by examiner

OBTAINING PROFILE DATA FOR USE IN OPTIMIZING COMPUTER PROGRAMMING CODE

CROSS REFERENCE TO RELATED APPLICATIONS

This is a divisional application of pending U.S. patent application Ser. No. 12/099,873, filed Apr. 9, 2008, entitled "Obtaining Profile Data for Use in Optimizing Computer Programming Code", which is a continuation of U.S. patent application Ser. No. 10/406,552, filed Apr. 3, 2003, entitled "Method and Apparatus for Obtaining Profile Data for Use in Optimizing Computer Programming Code", now issued as U.S. Pat. No. 7,386,838, both of which are herein incorporated by reference. This application claims priority under 35 U.S.C. §120 of U.S. patent application Ser. No. 12/099,873, filed Apr. 9, 2008, and of U.S. patent application Ser. No. 10/406,552, filed Apr. 3, 2003.

FIELD OF THE INVENTION

The present invention relates to digital data processing, and in particular to methods and apparatus for generating profile data concerning the performance characteristics of computer programs.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but using software having enhanced function, along with faster hardware.

In the very early history of the digital computer, computer programs which instructed the computer to perform some task were written in a form directly executable by the computer's processor. Such programs were very difficult for a human to write, understand and maintain, even when performing relatively simple tasks. As the number and complexity of such programs grew, this method became clearly unworkable. As a result, alternate forms of creating and executing computer software were developed. In particular, a large and varied set of high-level languages was developed for supporting the creation of computer software.

High-level languages vary in their characteristics, but all such languages are intended to make it easier for a human to write a program to perform some task. Typically, high-level languages represent instructions, fixed values, variables, and other constructs in a manner readily understandable to the human programmer rather than the computer. Such programs are not directly executable by the computer's processor. In order to run on the computer, the programs must first be transformed into a form that the processor can execute.

Transforming a high-level language program into executable form requires that the human-readable program form (source code) be converted to a processor-executable form (object code). This transformation process generally results in some loss of efficiency from the standpoint of computer resource utilization. Computers are viewed as cheap resources in comparison to their human programmers. High-level languages are generally intended to make it easier for humans to write programming code, and not necessarily to improve the efficiency of the object code from the computer's standpoint. The way in which data and processes are conveniently represented in high-level languages does not necessarily correspond to the most efficient use of computer resources, but this drawback is often deemed acceptable in order to improve the performance of human programmers.

While certain inefficiencies involved in the use of high-level languages may be unavoidable, it is nevertheless desirable to develop techniques for reducing inefficiencies where practical. This has led to the use of compilers and so-called "optimizing" compilers. A compiler transforms source code to object code by looking at a stream of instructions, and attempting to use the available resources of the executing computer in the most efficient manner. For example, the compiler allocates the use of a limited number of registers in the processor based on an analysis of the instruction stream as a whole, and thus hopefully minimizes the number of load and store operations. An optimizing compiler might make even more sophisticated decisions about how a program should be encoded in object code. For example, it might determine whether to encode a called procedure in the source code as a set of in-line instructions in the object code.

Even with all the compilation and associated high-level language tools available to the programmer, there are still some types of executable programming code, typically low-level operating system kernel functions, which are of such critical importance that they are manually programmed at a much lower level to achieve greater computer resource efficiency. At these lower levels, the programmer may decide how to represent data, allocate registers, assign storage addresses, and do other tasks often performed by the compiler or optimizing compiler.

A typical program contains many places at which flow of execution may diverge or converge, and many potential paths in the flow of program execution exist. For a typical program, many of these paths are rarely if ever used, while a relatively small number of the paths are utilized frequently. Rarely used paths may exist to handle special cases or errors, or may be unintentional side effects of the way in which a program was written. A program will generally perform more efficiently if the bulk of the system's resources are allocated to the most frequently used paths. For example, variables which occur in the most frequently used paths should be given preferences in the allocation of registers over variables which occur in the rarely used paths. Unfortunately, it is difficult for a compiler or optimizing compiler to know in advance which are the frequently used paths, since whether a path is frequently used or otherwise depends on the input data. One of the reasons that programming code written by a programmer at a low level tends to outperform code which is written at a higher level and compiled to object form is that the programmer usually knows better than the compiler which paths will be most frequently used.

Generally, it is possible to produce more efficient object code, and particularly to produce more efficient object code using an optimizing compiler, if it can be known in advance what the pattern of usage of the various code paths will be.

It is possible to collect data from actual or simulated runtime execution of a computer program in order to determine experimentally the frequency of execution of the various paths of a program. Such data is referred to herein as program execution profile data, or simply profile data for short.

Commonly, collection of profile data is accomplished by inserting special instructions into the program to collect data at key points. These instructions are referred to herein as "instrumentation instructions", or "hooks". A hook, which could be a single instruction or a set of instructions (including a called procedure) causes some record to be made each time it is encountered during execution of a program. Typically, the hook causes a corresponding counter to be incremented, although a record could take some other form.

A complete and accurate picture of the performance of a computer program requires that the frequency of taking each possible path in the flow of control be known. Because a typical computer program contains a very large number of possible paths, placing instrumentation hooks in every such path to measure flow is a significant burden. However, it is not necessary to directly measure every path. Mathematical techniques exist for determining a subset of the possible paths for instrumentation, from which the frequency of execution of the remaining unmeasured paths can be inferred. These techniques involve the construction of a control glow graph (CFG), which is a directed graph in which each node represents a basic block of code (i.e., a set of sequential instructions having only one entry point and no branches except at the end) and each arc represents a possible path for transfer of control from one block to another (by branching or by fall-through). The frequency of taking a path (arc) in the control flow graph is represented as an arc weight. It is assumed that flow in the graph is conserved, i.e., the sum of the arc weights of all arcs entering any node is equal to the sum of the arc weights of the arcs leaving the node. From a control flow graph, a spanning tree of arcs can be determined, such that the arc weight of any arc can be inferred from the weights of the arcs that are not in the spanning tree, based on the assumption that flow is conserved. Therefore, if instrumentation hooks are inserted only in the paths represented by arcs not in the spanning tree, the frequency of taking other paths can be inferred. Typically, a spanning tree can be constructed such that only 30%-40% of the arcs in the control flow graph need be instrumented, thus realizing a considerable reduction in the number of instrumentation hooks required.

However, even 30%-40% of the possible paths in a program often represents a very large number of paths. To minimize the deleterious effect of instrumentation hooks on program performance, instrumentation code should be as simple as possible. Specifically, a given hook usually increments a single counter in memory only, without performing other operations. A separate counter is associated with each hook. Counter values are examined and used to derive additional data only after data collection from the program ceases.

Where multiple processes execute the same instrumented program code simultaneously, the simplicity of the instrumentation code can lead to errors. The multiple processes need to access and increment the same counters, yet the instrumentation code has no protection against contention. If two processes both attempt to read, increment, and write back to the same counter simultaneously, one of the increments may be lost. This effect is referred to as "counter contention".

If all possible paths (control flow arcs) in a program are instrumented, the effects of counter contention is typically small. However, as explained above, instrumenting all paths is very burdensome. Where the arc weights of many paths are inferred from a smaller number of measured paths, errors in the measured paths due to counter contention can be propagated a significant distance in the graph. This may cause counter errors to propagate into code paths which are infrequently or never taken. A compiler attempting to optimize code based on such data may skew the optimization in favor of such paths, to the detriment of other areas of the programming code.

A need exists for a method and apparatus for obtaining more accurate profile data, without the burden of overly complex instrumentation code or larger numbers of instrumentation hooks.

SUMMARY OF THE INVENTION

Program execution profile data is collected by direct measurement of some code paths, and by inferring frequency of execution for paths not directly measured. The data collection process may cause errors, which are propagated by the inferencing process. The profile data thus constructed is further enhanced by detecting certain data mismatches, and adjusting inferred data to reduce the scope of errors propagated during the inferencing process.

In the preferred embodiment, a control flow graph of the program being measured is constructed, and control flow instrumentation "hooks" are added to a subset of the arcs in the control flow graph formed from the complement of a spanning tree of the graph. The hooks enable counters which count the number of times each respective path (arc) is taken to be incremented. The frequency data for arcs without hooks is inferred from the counts of arcs in the complement of the spanning tree. Because multiple processes may be executing simultaneously, there may be contention for the counters, causing errors to be introduced. These errors can be propagated when counts of unmeasured arcs are inferred. Each block in the control flow graph has one or more input arcs and one or more output arcs. The total counts of the inputs should match that of the outputs, and any mismatch is examined. For certain specific types of mismatches, it can be known or guessed which count is incorrect, and this count is accordingly corrected. Correction of arc counts proceeds recursively until it is no longer possible to correct mismatches. Additionally, certain other conditions are adjusted as presumed inaccuracies.

By intelligently correcting inferred arc counts, any errors introduced by erroneous counts of measured arcs are reduced in scope, making the profile data more reliable. If such profile data is used by an optimizing compiler to generate optimized object code, the compiler will be better able to identify and optimize critical code paths, and will generally produce efficiently executing object code.

The details of the present invention, both as to its structure and operation, can best be understood in reference to the

DETAILED DESCRIPTION OF THE PREFERRED EMBODIMENT

Development Environment Overview

The present invention relates to the generation of accurate program execution profile data ("profile data"). In general, profile data is used as part of a program development process, and specifically is used by an optimizing compiler to generate optimized executable machine code (object code). However, the present invention is not limited to this particular use, and profile data could conceivably be used for other purposes. For example, profile data could be used as feedback to the programmer for improved manual generation of source code in a high-level language or assembly level code, or be used by a link-time optimizer or other form of automatic optimizer.

Figure 4:
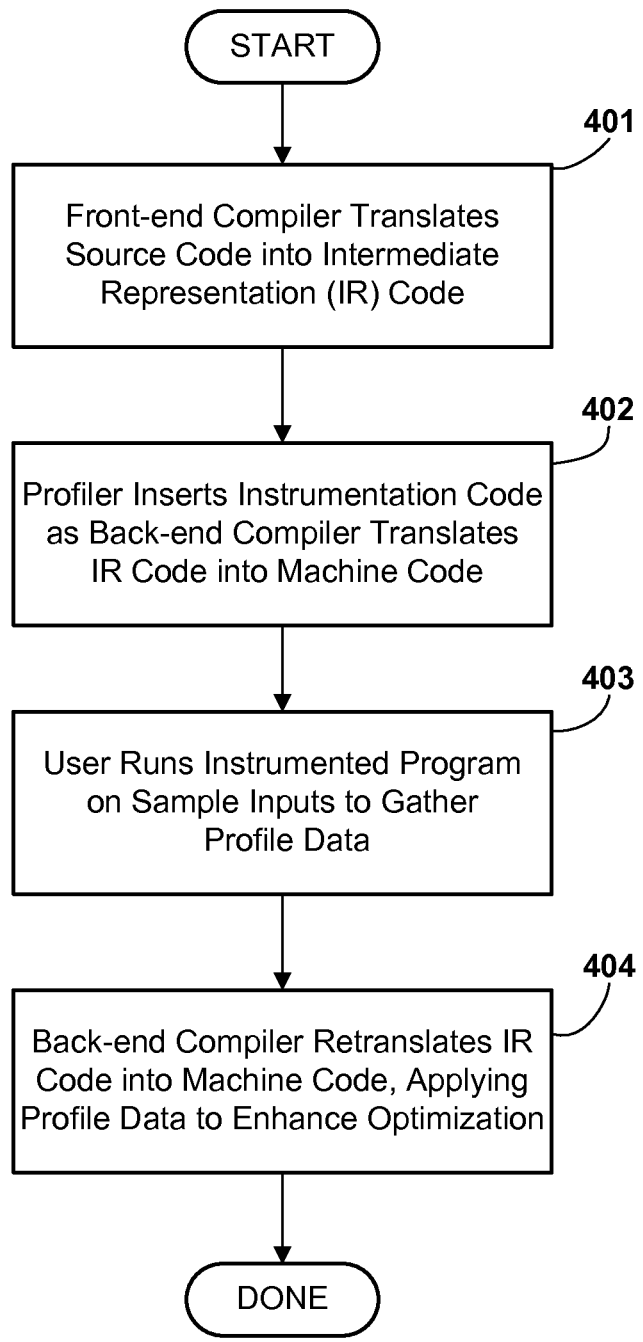
FIG. 4 is a high-level flow diagram of a typical prior art programming code optimizing process using profile data.

A typical prior art optimizing process using profile data is shown at a high level in FIG. 4. First a front-end compiler translates the source code into an intermediate representation (IR) code (step 401). Next, a back-end compiler processes the intermediate representation, inserting instrumentation code into the executable machine code (step 402). Instrumentation code (also referred to herein as "control flow hooks" or "hooks" is code that typically increments counters to keep track of how many times each branch in the executable code when the compiled program is executed. Once the instrumentation code is inserted into the executable code, the instrumented program is run, using simulated or real data input, and profile data is collected (step 403). For the case of instrumented code, the profile data initially consists of count values for each branch at which instrumentation code was inserted. This profile data may be extended to unmeasured branches by inferring the values of unmeasured branches from the known values of measured branches. The back-end compiler then re-translates the IR code into a new version of the executable machine code, applying the profile data to enhance optimization of the computer program (step 404).

Once profile data is obtained, there are various known techniques for using the data to optimize the executable code. For a general discussion of code optimization using profile data, see Schmidt et al, "Profile-Directed Restructuring of Operating System Code", IBM Systems Journal, vol. 37. No. 2, p. 270-297 (1998). Additional such techniques are disclosed in the following U.S. patents and patent applications, all of which are herein incorporated by reference: U.S. Pat. No. 5,950,009 to Bortnikov et al.; commonly assigned U.S. patent application Ser. No. 09/948,749, filed Sep. 7, 2001, to Schmidt; commonly assigned U.S. patent application Ser. No. 09/992,324, filed Nov. 19, 2001, to Roediger et al.; and commonly assigned U.S. patent application Ser. No. 10/282,811, filed Oct. 29, 2002, to Roediger et al.

DETAILED DESCRIPTION

Figure 1:
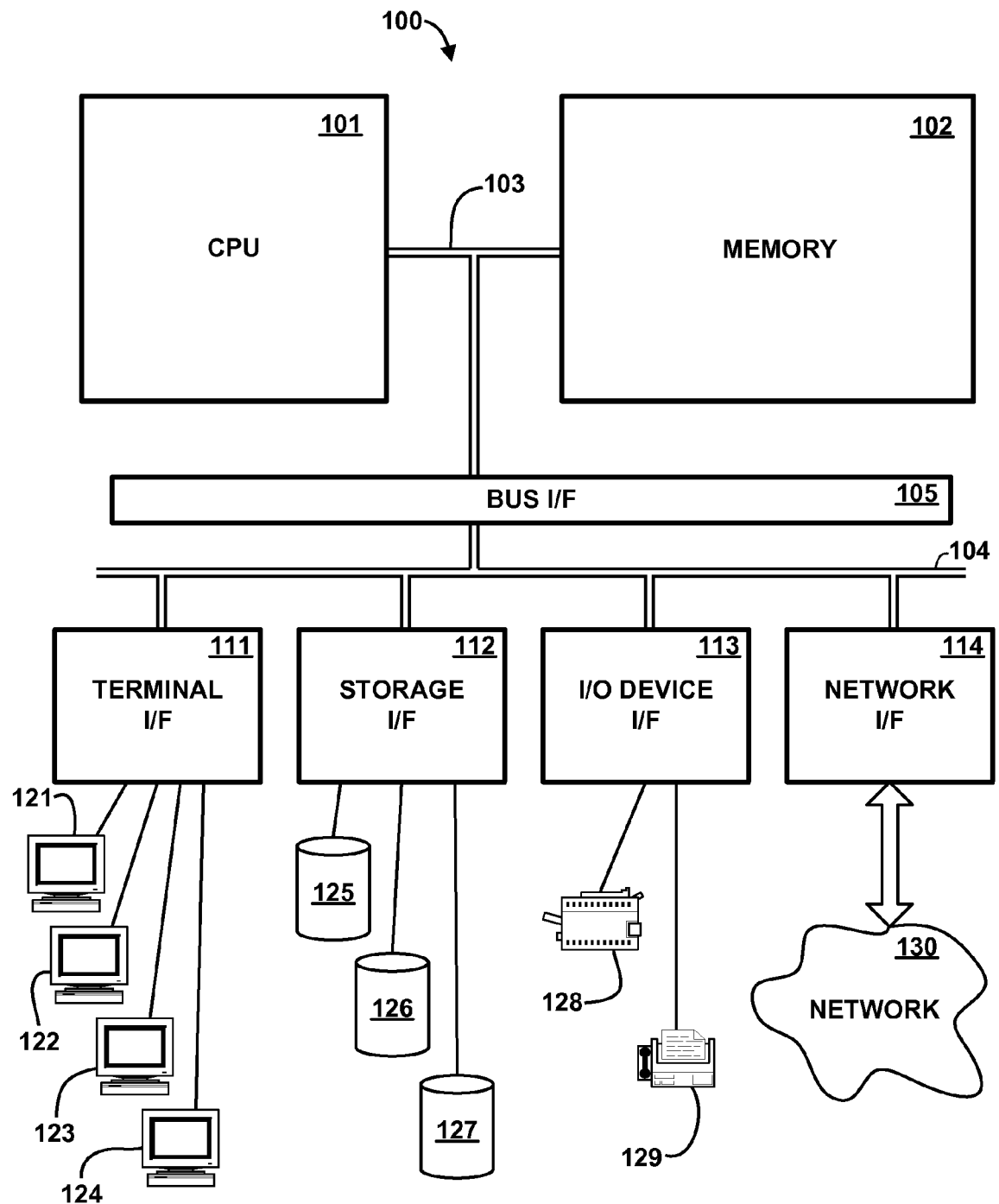
FIG. 1 is a high-level block diagram of the major hardware components of a computer system for generating program execution profile data, according to the preferred embodiment of the present invention.

Referring to the Drawing, wherein like numbers denote like parts throughout the several views, FIG. 1 is a high-level representation of the major hardware components of a computer system 100 which collects and processes program execution profile data for use in optimizing a computer program, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicated with system 100 over network 130. Computer system 100 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
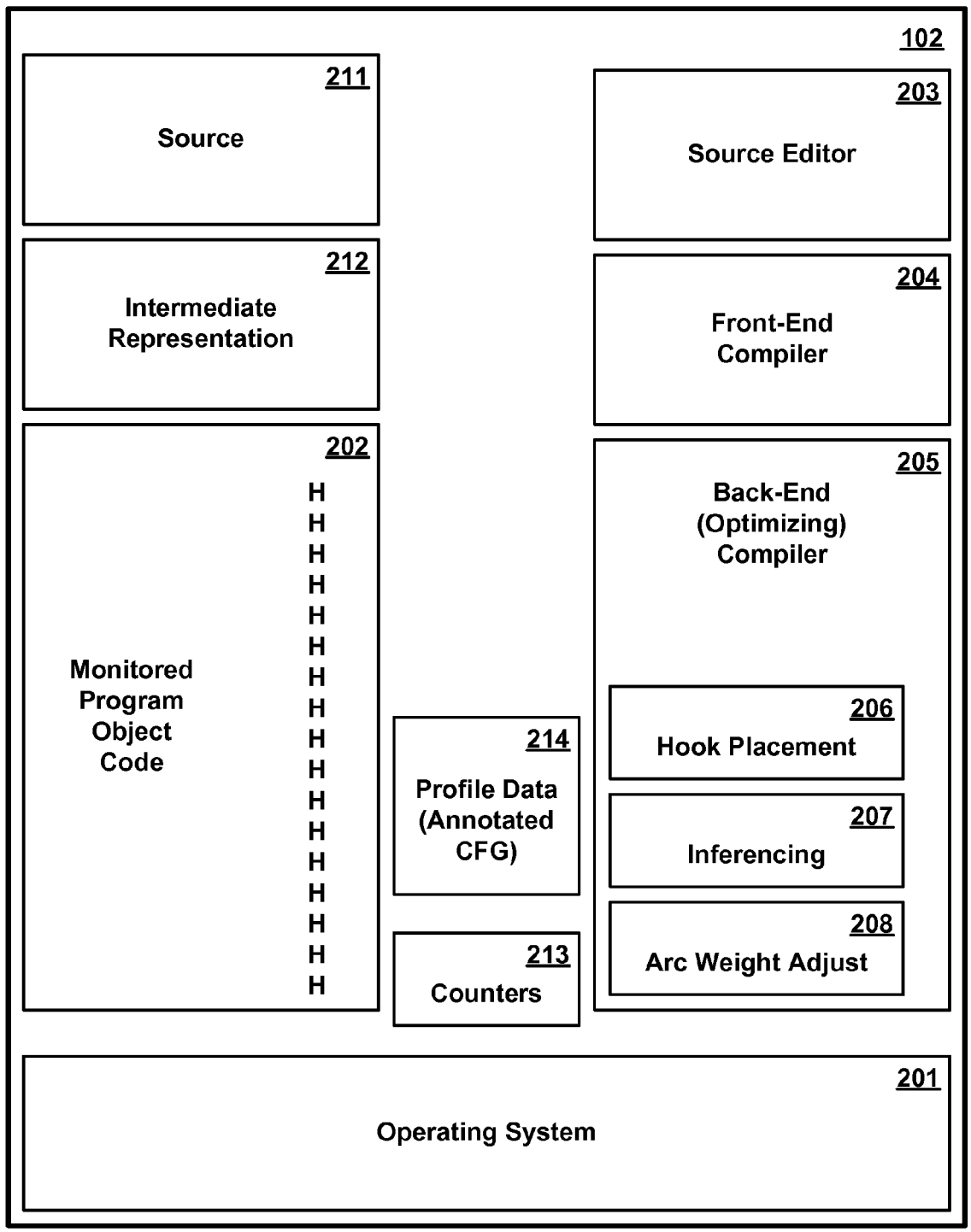
FIG. 2 is a conceptual illustration of the major software components of a computer system for generating profile data, according to the preferred embodiment.

FIG. 2 is a conceptual illustration of the major software components of system 100 in memory 102. Operating system kernel 201 provides various low-level software functions, such as device interfaces, management of memory pages, management and dispatching of multiple tasks, and so forth, as is well-known in the art. Monitored executable program 202 is a computer program in executable form for which profile data is collected as further described herein. Monitored program 202 contains executable instructions and a plurality of instrumentation code segments, known herein as "control flow hooks", at key junctures of the instruction stream, as represented by the letters "H" within program 202 in FIG. 2 (although in a typical monitored program, the actual number of such hooks is much larger than represented in FIG. 2). Although monitored program 202 is shown separately from operating system 201 in FIG. 2, it should be understood that the monitored program could be the operating system or some portion thereof. Furthermore, although the term "monitored program" is used herein, the module or entity being monitored need not necessarily be a stand-alone executable program, but may be some portion, function, or procedure of a program, such as a separately compiled module, a dynamic link library of called procedures, or some other software entity.

Source editor 203 is an executable computer program which supports the creation and editing of source code for other computer programs, using any of various known techniques. Source file 211 represents a file containing source code for program 202, which is created and edited using editor 203. Source editor 203 may be a general-purpose text editor which is non-specific to a programming language, or may a special-purpose source editor for a particular language having built-in syntax checking or other features.

Front-end compiler 204 is an executable program which converts source file 211 to an intermediate representation 212. Intermediate representations may take any of various forms, but typically they provide some form of commonality between different source or object forms. I.e., source code written in different forms may be compiled by different front-end compilers to a common intermediate form for further compilation by a common back-end compiler. Alternatively, source code may be compiled by a single front-end compiler to a common intermediate form for use on different hardware platforms, the common intermediate form being then compiled by different back-end compilers associated with different respective hardware.

Back-end compiler 205 is an executable computer program which compiles the intermediate representation 212 into object code modules of executable statements; compiler 205 is preferably an optimizing compiler. In accordance with the preferred embodiment, compiler 205 includes various support functions for supporting the collection and generation of profile data. In particular, compiler 205 contains hook placement function 206, inferencing function 207, and arc weight adjustment function 208. Hook placement function 206 automatically determines a spanning tree of arcs in the control flow graph and places control flow hooks in the monitored program 202. Inferencing function 207 infers the arc weights of non-measured arcs from the actual counter data (arc weights) of measured arcs in the control flow graph. Arc weight adjustment function 208 further detects mismatches in arc weights and other suspicious conditions, and performs an adjustment to reduce the scope of errors propagated by the inferencing process, as more fully explained herein.

A control flow hook (instrumentation code) is anything which might trigger the collection of profile data at selected paths during the execution of monitored program 202. In the preferred embodiment, the control flow hooks are simple instructions which increment counters 213, although it might be possible to use other mechanisms. Because the number of such hooks is typically large, code which implements each hook is kept as simple as possible. In particular, in order to minimize the effect of profile data collection on the performance of program 202, the hooks do not contain contention resolving mechanisms where multiple processes are executing the same code. As a result, errors may be introduced in counters 213 as a result of contention for the counters by multiple concurrently executing processes.

Data collected during execution of program 202 is in the form of multiple counters 213, one corresponding to each control flow hook in program 202. The counters simply count the number of times a hook was encountered during a sampling period. Compiler 205 uses this data to build an annotated control flow graph 214, in which all arcs are annotated with counts representing the number of times the arc was traversed during execution. The arcs corresponding to counters 213 (the measured arcs) are annotated directly with the counter values, while the remaining (non-measured) arcs have values which are inferred by inferencing function 207, and later adjusted by arc weight adjustment function 208.

Although hook placement function 206, inferencing function 207 and arc weight adjustment function 208 are shown as separate functions within compiler 205, it will be understood that some or all of these functions could be separate from compiler 205. Annotated control flow graph 214 is represented separately from compiler 205 because it is data rather than executable code, but in fact it may occupy memory space within the allocation of memory for compiler 205. Furthermore, while source editor 203, front-end compiler 204 and back-end compiler 205 are shown as separate entities, it will be understood that these are often packaged together as part of an integrated application development environment. It will be further understood that in some programming development environments, there is no intermediate code representation, and front-end compiler 204 and back-end compiler 205 are effectively merged. There could alternatively be multiple levels of intermediate representation. Furthermore, it will be appreciated that some or all of these functions may be incorporated into an operating system. Additionally, although functional modules 203-208 are depicted in FIG. 2 on a single computer system 100 for completeness of the representation, it is not necessarily true that all functions will be present on a single computer system or will be performed on a single computer system. For example, editing of source code may be performed by source editors located in a distributed manner in individual workstations, while compiling and analysis of code might be performed by a centralized server.

Although a certain number of modules, programs or files are shown in the conceptual representation of FIG. 2, it will be understood that the actual number of such entities may vary, and in particular, that in a complex program development environment, the number of such entities is typically much larger. Furthermore, it will be understood that various entities could be stored in a distributed fashion on multiple computer systems.

While the software components of FIG. 2 are shown conceptually as residing in memory 102, it will be understood that in general the memory of a computer system will be too small to hold all programs and other data simultaneously, and that information is typically stored in data storage devices 125-127, comprising one or more mass storage devices such as rotating magnetic disk drives, and that the information is paged into memory by the operating system as required.

Figure 3:
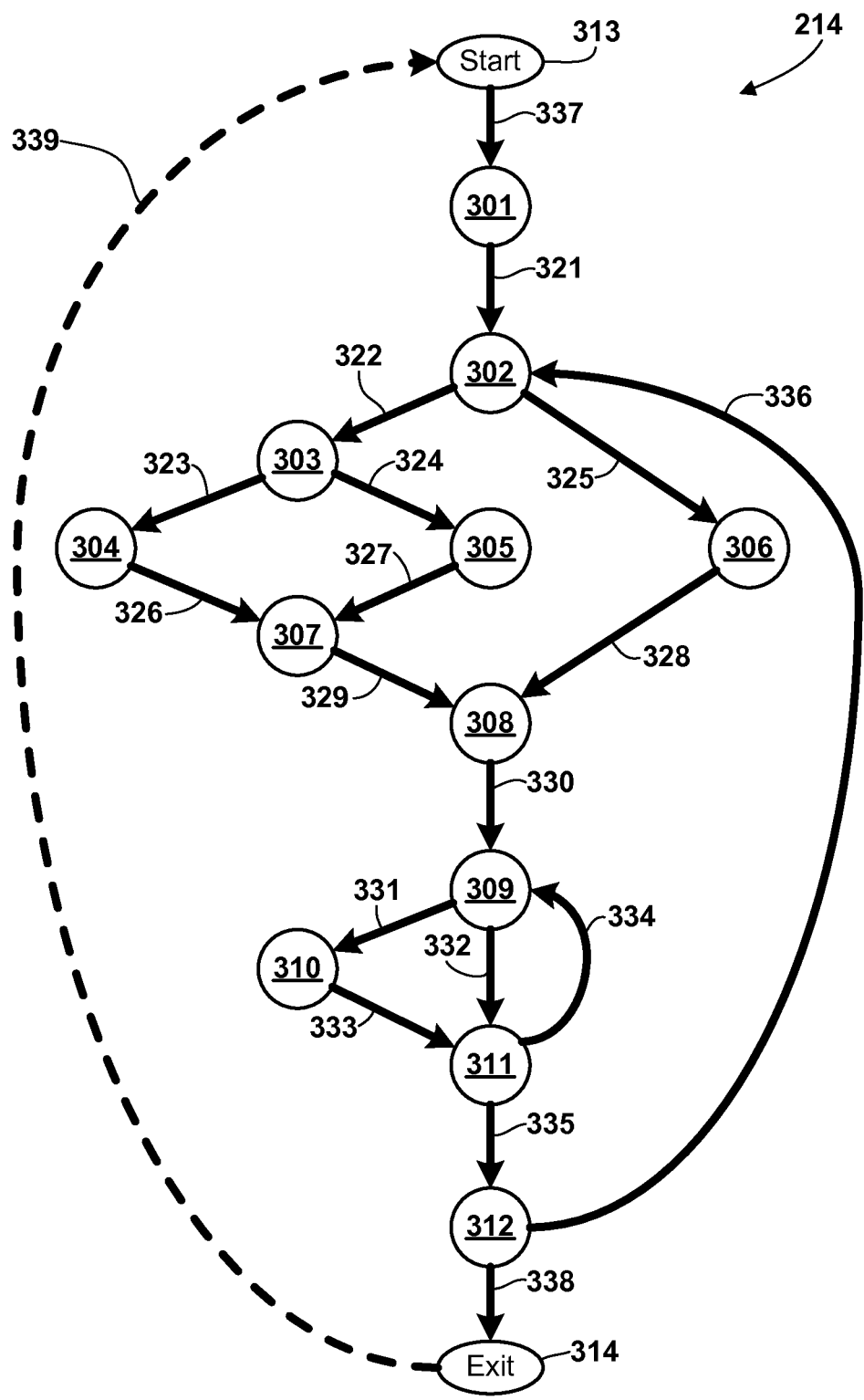
FIG. 3 is a conceptual illustration showing a structure of a very simplified control flow graph, according to the preferred embodiment.

FIG. 3 is a conceptual illustration showing a structure of a very simplified control flow graph 214, according to the preferred embodiment. It should be understood that FIG. 3 is a conceptual illustration, and that graph 214 is actually binary data, which may be structured according to any appropriate form, and further that an actual control flow graph is usually far more complex, having a much larger number of nodes and arcs. As shown in FIG. 3, a control flow graph contains a plurality of nodes 301-312 and directed arcs 321-336 connecting the nodes, each node representing a block of code having only a single straight path of execution (referred to as a "basic block"), and each arc representing a possible path (such as a branch) from one node to another. Additionally, start node 313 and end node 314 represent entry and exit points, respectively, each having respective arcs 337, 338 to or from a basic block of code. For completeness, a dashed arc 339 is shown between start and end nodes, to represent the fact that the inflow at start node 313 should balance the outflow at end node 314.

Every arc has an associated numerical weight (not shown in FIG. 3), representing flow through the arc. If we assume that, for every node, the sum of inflow at the node must equal the sum of the outflow, it can be shown that a spanning tree can be constructed for the control flow graph of FIG. 3, by which it is possible to infer the weights of some arcs from the known weights of other arcs. In the example of FIG. 3, if only the weights of arcs 327, 328, 332, 334, 335 and 336 are known, the weights of all remaining arcs can be inferred. For example, from the weights of known arcs 335 and 336, we can infer the weight of arc 338 as ($Wt_{335}$-$Wt_{336}$). Each inferred weight provides additional data for more inferences, eventually allowing one to infer all weights in the graph.

In accordance with the preferred embodiment, hook placement function 206 in compiler 205 automatically determines a spanning tree of arcs and places hooks at the arcs that are not part of the spanning tree. This spanning tree should reduce the number sites for instrumentation code as much as possible. The spanning tree ideally produces a mathematically minimal complement, although the algorithm used to generate the spanning tree need not necessarily guarantee that the complement is minimal. In the example of FIG. 3, hooks are places along arcs 327, 328, 332, 334, 335 and 336, and not placed along other arcs. During execution, data is collected (i.e., counters are incremented) only for these arcs, which are called the measured arcs. The weights of the non-measured arcs are inferred by inferencing function 207.

In accordance with the preferred embodiment of the present invention, program execution profile data is collected by placing hooks in the code at points corresponding to the arcs in the complement of a spanning tree, and data thus collected is used to infer the weights of remaining arcs. Due to the nature of the real time data collection process, it is known that the measured weights of arcs are not always accurate. Although measured errors are usually small in magnitude, these errors can be propagated down a long chain of arcs by the inferencing process, causing increased distortion of the profile data. An arc weight adjustment process therefore identifies certain mismatch or suspicious conditions in the inferred arc weights, and makes adjustments to the inferred weights to reduce the scope of the propagated errors.

In understanding the arc weight adjustment algorithms explained herein, it is helpful to appreciate a few points. First, arc weight adjustment is a matter of applying heuristics. The very fact that a mismatch has occurred tells us that there is an error, although we can't be sure which arc counts are erroneous. The heuristics described herein are designed to remove the most likely source of the error. They can not be proven to be correct 100% of the time, but in most cases they will reach a correct result.

Second, most errors occur because there is contention for a counter. I.e, multiple processes are concurrently executing program 202, and in these circumstances it is possible that two processes will nearly simultaneously attempt to increment a counter. Although various protection mechanisms (semaphores, locks, etc.) are known in the art, whereby corruption of data in these circumstances can be prevented, all of these mechanisms involve significant overhead. In order to minimize the effect of instrumentation hooks on program performance, the counters are unprotected by any such mechanism. Therefore, counter values may become corrupted as a result of attempted simultaneous access to a counter.

Third, because many code paths are unused or very rarely used, a significant number of measured counts can be expected to be zero. It will be observed that, if two process simultaneously attempt to increment a counter, at least one will succeed. The resulting value may be incorrect, but it will be non-zero. Therefore, if a measured counter value is zero, we may assume that this type of error has not occurred. This gives us a basic premise for the heuristics that are implemented as described herein: an arc weight of zero is assumed to be reliable. This is true whether the arc weight is a measured weight or an inferred weight, since an inferred weight of zero is generally derived from measured weights of zero in one or more other arcs.

Finally, we expect that most measured errors are relatively small in magnitude compared with the total measured count. This is so because a process will usually have to traverse a particular arc many times before it does so coincidentally at the same time that another process is doing so. Even though these errors are small in magnitude, propagation of the errors by inferencing can reduce the efficiency of the code produced by the optimizing compiler.

Figure 16A:
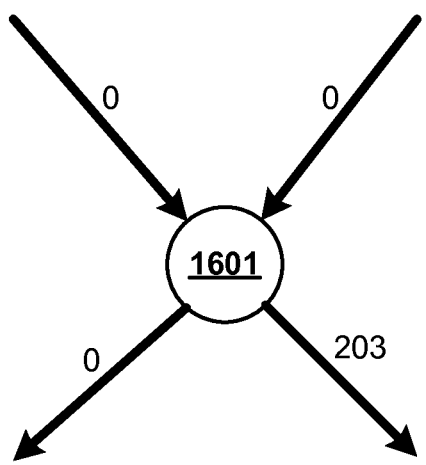
FIGS. 16A, 16B, and 16C show examples of a zero-mismatch, a zero-join-mismatch, and a suspicious path, respectively, which are the targets of heuristics for adjusting arc weights, according to the preferred embodiment.
Figure 16B:
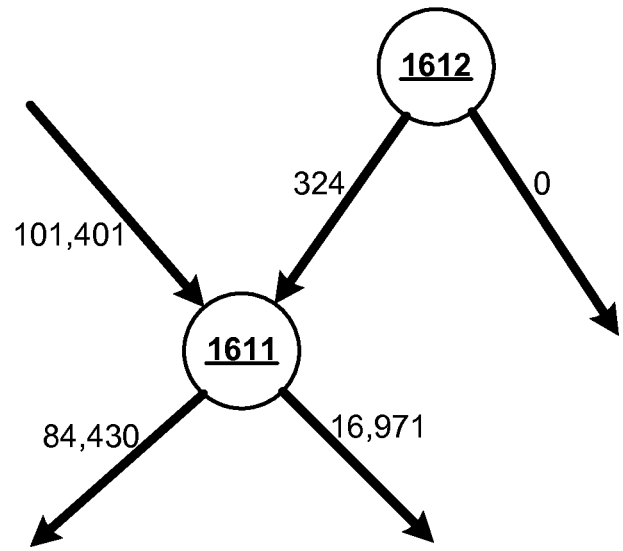
Figure 16C:
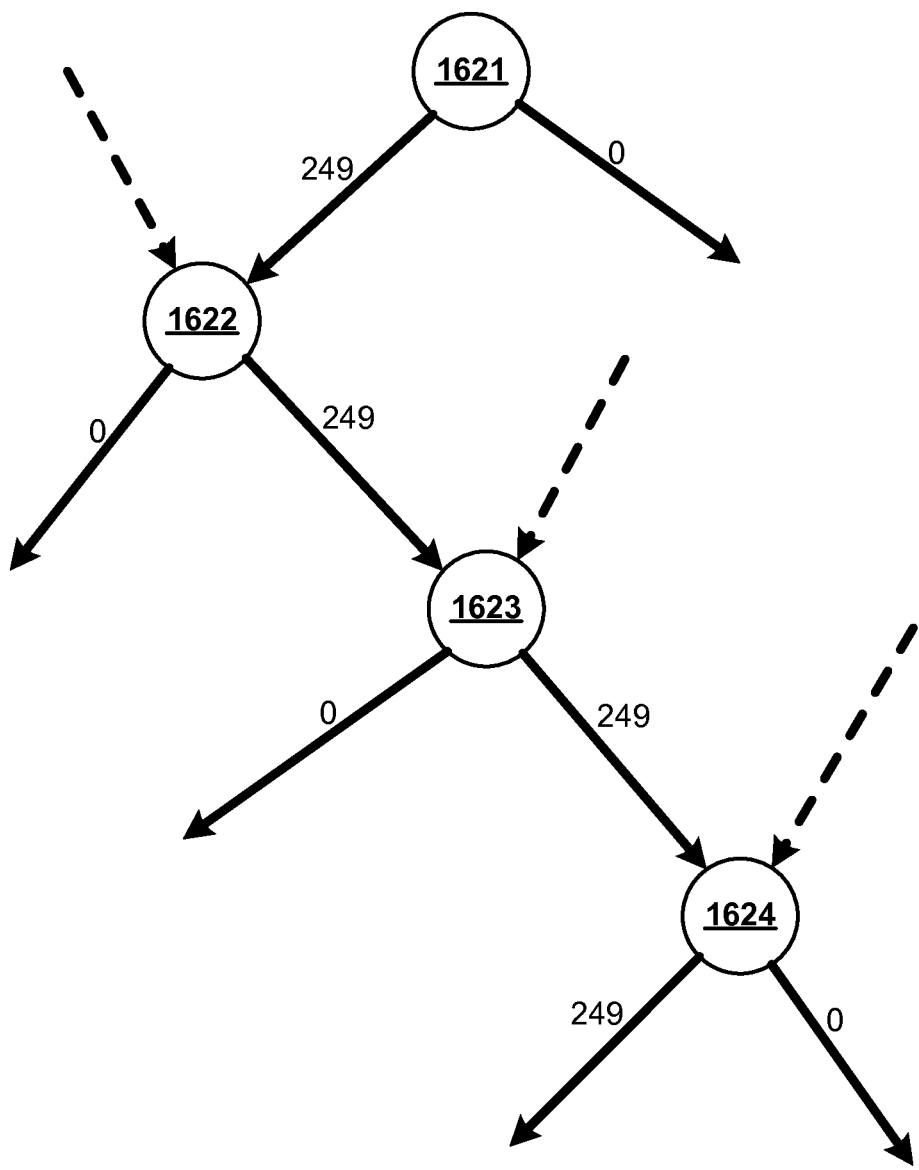

The heuristics identify three circumstances which are usually considered likely errors, with certain exceptions explained in greater detail herein. The simplest of these is a "zero-mismatch". A zero-mismatch is a condition in which either: (a) the sum of the arc weights entering a node (inflow) of the control flow graph is zero and the sum of weights leaving that node (outflow) is non-zero; or (b) the outflow of the node is zero and the inflow is non-zero. FIG. 16A shows an example of a node 1601 with a zero-mismatch. Because it is assumed that zero is more reliable than non-zero, in this case the non-zero weight is adjusted to zero. The second condition is called a "zero-join-mismatch". A zero-join-mismatch occurs at a node in which neither the outflow nor the inflow is zero, but the difference between outflow and inflow is exactly equal to the weight of a particular one of the arcs. However, in order to confirm the node as a zero-join mismatch, the offending arc is followed to the node at its other end; if all other outgoing arcs (in the case of predecessor node) or all other incoming arcs (in the case of a successor node) are zero, then the zero-join-mismatch is confirmed. FIG. 16B shows an example of a node 1611 with a zero-join-mismatch, having a predecessor node 1612 with no other non-zero outgoing arcs. Because large numbers are usually involved, the fact that a particular arc is coincidentally the same weight as the amount of the error is suspicious, and it is therefore assumed that weight of the particular arc is erroneous and should be zero. The third circumstance is called a "suspicious path". A suspicious path is a set of four or more arcs in successive nodes having identical weights, where the weights of all other arcs entering or leaving the nodes is zero and there are multiple exit points from each node. FIG. 16C shows an example of a suspicious path. A suspicious path is regarded as a probable error because it is unlikely that in actual execution the program would always follow the same path, without ever taking any of the possible branches. It is more likely in this circumstance that the arc weights are the result of an inferencing error which was propagated through a rarely used section of code. Accordingly, these weights are adjusted to zero.

As explained above, FIG. 4 shows at a high level a process of generating optimized code using profile data, and represents one possible environment in which the present invention may be used. In accordance with the preferred embodiment of the present invention, data gathered during execution of the instrumented program (represented as step 403) is refined as described herein before input to the back end compiler for re-translating the IR code into machine code (step 404). The process of generating and refining profile data is explained in greater detail below and illustrated in FIGS. 5-15.

Figure 5:
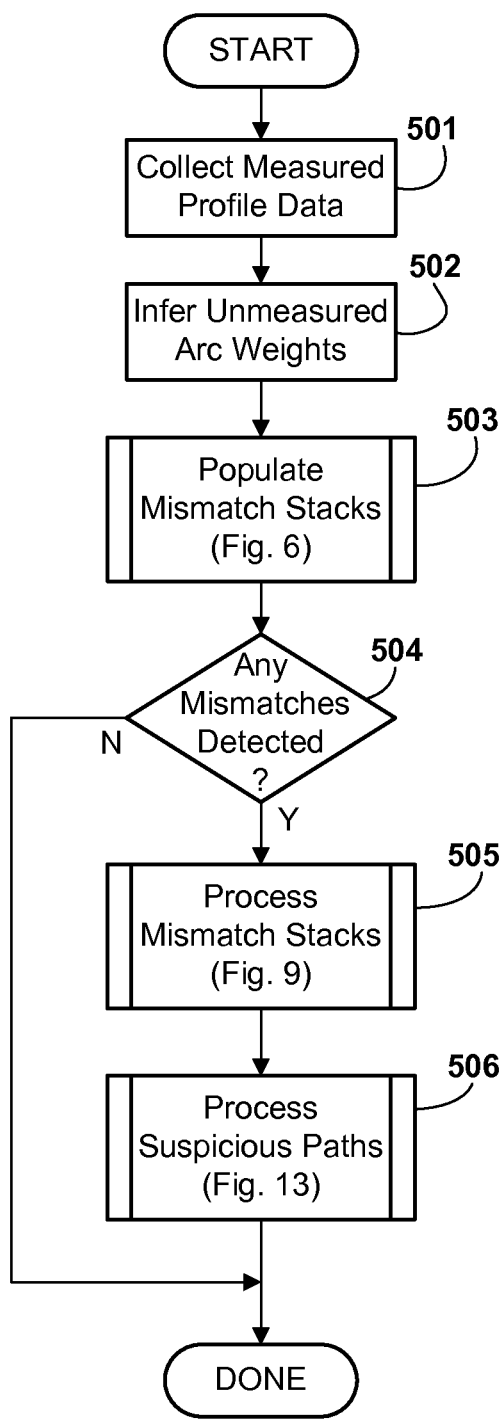
FIG. 5 is a high-level flow diagram showing the overall process of generating and refining profile data, according to the preferred embodiment.

FIG. 5 is a high-level flow diagram showing the overall process of generating and refining profile data, according to the preferred embodiment. Referring to FIG. 5, counter data from instrumented program 202 is first collected during execution (step 501). While various prior art techniques exist for collecting profile data, in accordance with the preferred embodiment the counters record the number of times instrumentation code or "hooks" are encountered at critical paths, these paths representing arcs in the complement of a spanning tree in the control flow graph for the program. The inferencing function 207 of compiler 205 then constructs the control flow graph and infers the values of all non-measured arcs from the counter values for the measured arcs (step 502).

At this point, the arc weight adjustment function 208 takes over to further refine the profile data (now in the form of an annotated control flow graph). The arc weight adjustment function first populates mismatch stacks of detected mismatches (represented in the high-level flow diagram of FIG. 5 as step 503, and shown in further detail in FIGS. 6-8). If any mismatches are detected (the "Y" branch from step 504), the arc weight adjustment function then processes the mismatches on the mismatch stacks (represented in the high-level flow diagram of FIG. 5 as step 505, and shown in greater detail in FIGS. 9-12 and 7). The arc weight adjustment function then processes any paths deemed suspicious (represented in the high-level flow diagram of FIG. 5 as step 506, and shown in greater detail in FIGS. 13-15). If, on the other hand, no mismatches are detected at step 504, steps 505 and 506 are by-passed. The arc weight adjustment function is then finished, and the adjusted profile data may be used for optimized compilation or for other uses.

Figure 6:
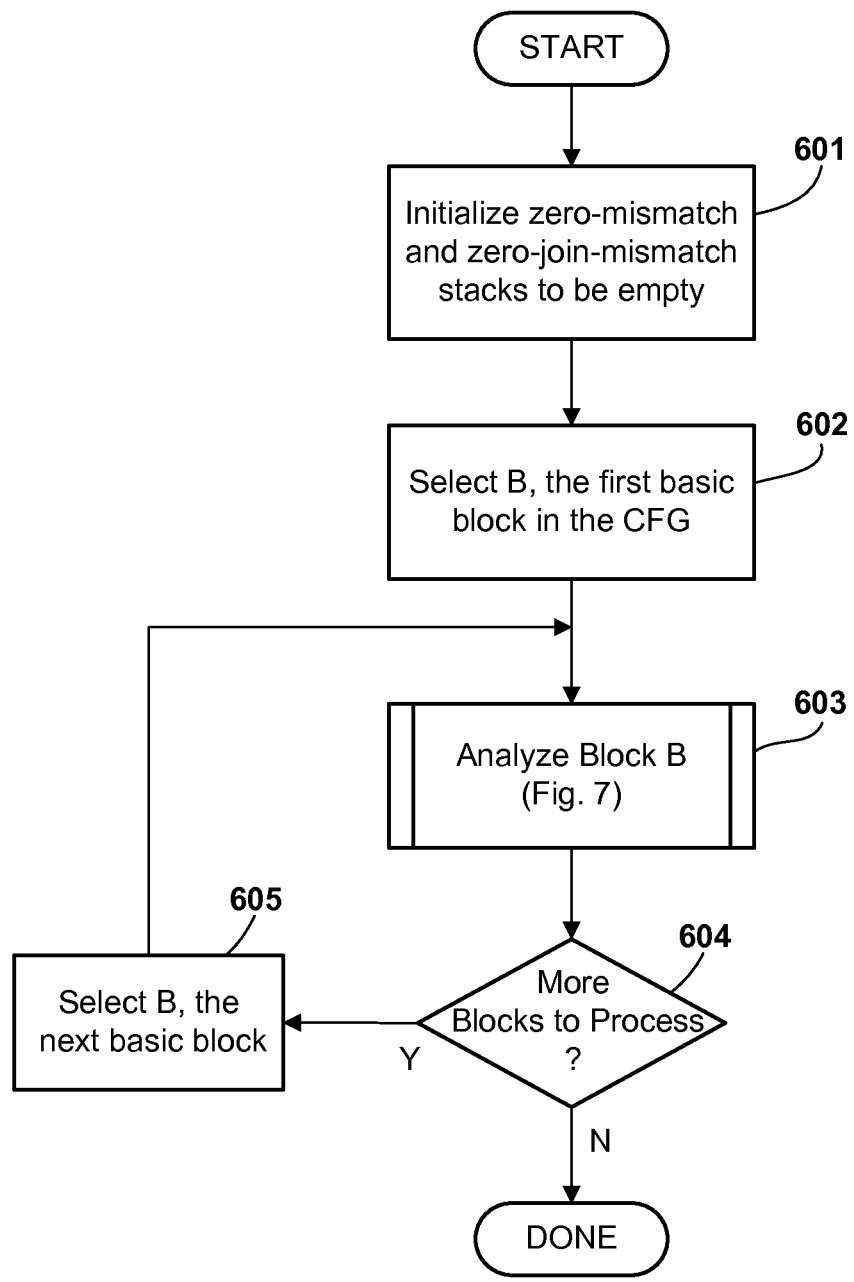
FIG. 6 is a flow diagram showing in expanded form the process of detecting mismatches in an annotated control flow graph and populating mismatch stacks, within the process of FIG. 5, according to the preferred embodiment.

FIG. 6 is a flow diagram showing in expanded form the process of detecting mismatches in an annotated control flow graph and populating mismatch stacks, represented in FIG. 5 as step 503. The process begins by initializing two stacks, designated the zero-mismatch and the zero-join-mismatch, to be empty (step 601). These stacks will be used to record detected zero-mismatches and zero-join-mismatches, respectively.

The arc weight adjustment function then selects a first basic block B (i.e., a node) in the control flow graph for analysis (step 602). It then analyzes this selected basic block for the occurrence of certain mismatches (represented in FIG. 6 as step 603, and shown in greater detail in FIGS. 7-8), causing mismatches to be placed on one or the other of the stacks. If any more basic blocks remain in the control flow graph to be analyzed, the "Y" branch is taken from step 604, a next basic block B is selected for analysis (step 605), and this basic block is analyzed as in the case of the previous block(s) (step 603). When all basic blocks have been analyzed, the "N" branch is taken from step 604 and the population of the mismatch stacks (represented as step 503 in FIG. 5) is complete.

Figure 7:
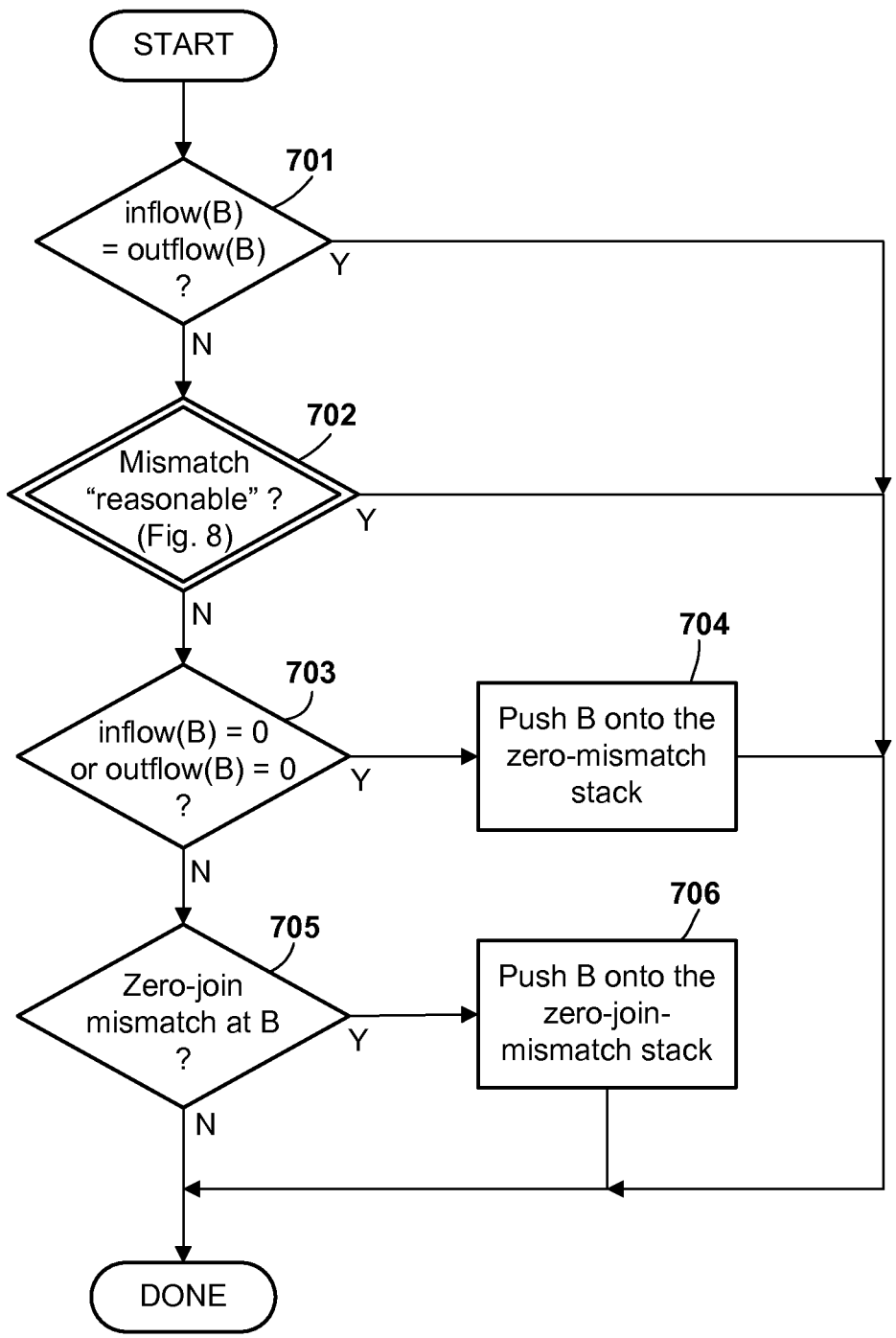
FIG. 7 is a flow diagram showing in expanded form the process of analyzing a single basic block for mismatches, according to the preferred embodiment.

FIG. 7 is a flow diagram showing in expanded form the process of analyzing a single basic block (node of the control flow graph) for mismatches. This process is represented in FIG. 6 as the single step 603, and further represented in FIGS. 10 and 11 as steps 1005 and 1105, respectively, the process of analyzing a single block for mismatches being called from multiple locations. In general, we expect the inflow to any node in the graph to equal the outflow from the node, and in the broadest sense, any node for which this is not the case may be considered a "mismatch". However, certain mismatches are deemed reasonable, while certain others are deemed too difficult to classify, so only some mismatches are actually identified and added to one of the mismatch stacks.

Referring to FIG. 7, the arc weight adjustment function first compares the sum of the arc weights of the input arcs (i.e., the inflow) to the basic block under consideration with the sum of the arc weights of the output arcs (i.e., the outflow) (step 701). If the inflow is equal to the outflow, there is no mismatch, and the "Y" branch is taken from step 701, by-passing the remaining steps of FIG. 7. If the inflow is not equal to the outflow, the process then considers whether the difference can be considered "reasonable". This decision is represented in FIG. 7 as step 702, and shown in greater detail in FIG. 8.

Figure 8:
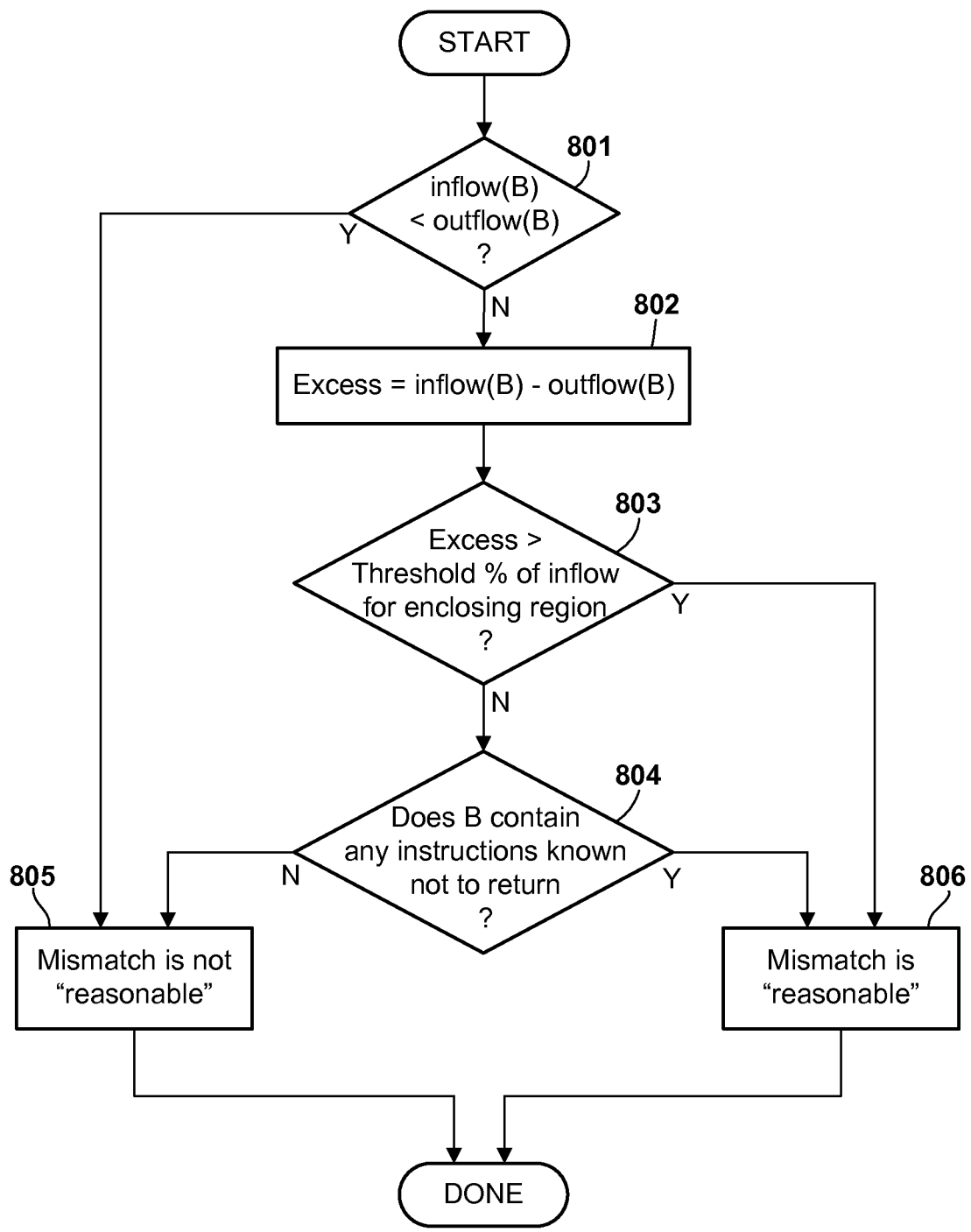
FIG. 8 is a flow diagram showing in expanded form the process of classifying a mismatch as "reasonable" or otherwise, within the process of FIG. 7, according to the preferred embodiment.

FIG. 8 is a flow diagram showing in expanded form the process of classifying a mismatch as "reasonable" or "unreasonable", represented in FIG. 7 as step 702. The arc weight adjustment function first considers whether the inflow is less than the outflow (step 801). Under no circumstances should the inflow be less than the outflow, since that would imply that run-time processes are originating in block B without any entry point. Therefore, if outflow exceeds inflow, the "Y" branch is taken from step 801, and the mismatch is deemed "not reasonable" (step 805).

If, on the other hand, inflow exceeds outflow (the "N" branch from step 801), it is possible that the arc weights are correct. This is so because a thread of execution can terminate at block B, even though it can't originate there. For example, some operation performed by block B might be causing an error or exception which aborts execution or does not return to block B after handling the error or exception. Alternatively, certain special instructions might terminate the program (such as the "exit( )" instruction in C). Accordingly, the arc weight adjustment function determines the "excess" as the difference between the inflow to block B and the outflow from block B (step 802). If the excess is greater than a threshold (step 803), the "Y" branch is taken and the mismatch is considered "reasonable" (step 806). In the preferred embodiment, the threshold used at step 803 is five percent of the total inflow for the enclosing region, the enclosing region being the nearest enclosing loop containing block B, or the entire procedure containing block B if B is not in a loop, although some other threshold measurement might be used. The reason for the threshold is that errors introduced by counter contention are usually small in magnitude compared with the total volume of inflow and outflow. If the mismatch is significant (exceeds the threshold), then it is probable that the mismatch is being caused by something more systematic and predictable than mere counter contention, and so the mismatch is deemed "reasonable", i.e. probably not the result of erroneous counters.

If the magnitude of the mismatch ("excess") does not exceed the threshold, the "N" branch is taken from step 803. The arc weight adjustment function then considers whether block B contains any special instructions of a type known not to return (step 804), which would account for the mismatch. If block B does not contain any such instructions, the mismatch is deemed "not reasonable" (step 805); if block B does contain such an instruction, the mismatch is deemed "reasonable" (step 806).

Returning again to FIG. 7, if the mismatch is considered "reasonable", the "Y" branch is taken from step 702 and the remaining steps of FIG. 7 are by-passed. If the mismatch is considered "not reasonable", the "N" branch is taken from step 702. The arc weight adjustment function then considers whether the inflow to block B is zero, or the outflow to block B is zero (step 703). If either of these is the case, then block B exhibits a "zero-mismatch", an example of which is shown as node 1601 in FIG. 16A. The "Y" branch is therefore taken from step 703, and block B is pushed onto the zero-mismatch stack (step 704) for later processing.

If a zero-mismatch is not present, the "N" branch is taken from step 703, and the arc weight adjustment function considers whether block B exhibits a "zero-join-mismatch" (step 705), an example of which is shown as block 1611 in FIG. 16B. Finding a zero-join-mismatch requires a two-part test, the first part of which involves determining the difference between inflow to and outflow from block B, and comparing this difference to the individual arcs. If any arc matches the difference, then block B is a possible zero-join-mismatch. To confirm block B as a zero-join-mismatch, the arc which was identical to the difference ("offending arc") is followed to the immediately attached node, which is a predecessor node in the case of an incoming arc or a successor node in the case of an outgoing arc. If, in the case of a predecessor node (shown as node 1612 in the example of FIG. 16B), all outgoing arcs other than the offending arc are zero, or if, in the case of a successor node, all incoming arcs other than the offending arc are zero, then the node in which the mismatch was originally detected (node 1611 in the example of FIG. 16B) is confirmed as a zero-join-mismatch. In this case, the "Y" branch is taken from step 705, and block B is pushed onto the zero-join-mismatch stack (step 706). This completes the analysis of block B. It will be noted that some mismatches will drop through the "N" branch from step 705, meaning that the heuristics described herein may be unable to classify and adjust them.

Figure 9:
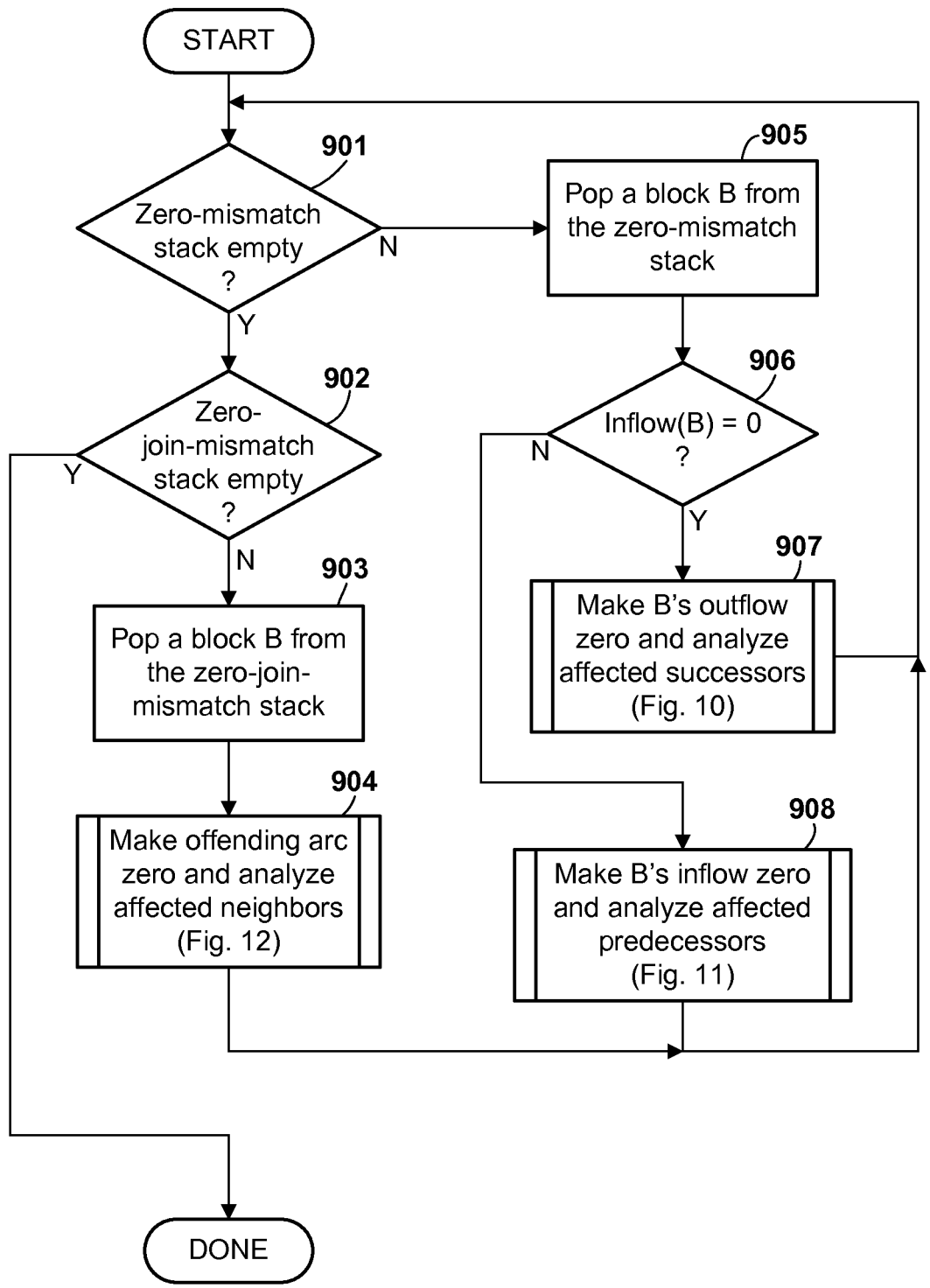
FIG. 9 is a flow diagram showing in expanded form the processing of the mismatch stacks, within the process of FIG. 5, according to the preferred embodiment.

Referring again to FIG. 5, after all blocks are analyzed and the mismatch stacks populated as described above with reference to FIGS. 6-8, if any mismatches were detected, the "Y" branch is taken from step 504. The arc weight adjustment function then processes the mismatch stacks (step 505), as shown in FIG. 9. The test of mismatches detected in step 504 is whether, for any node, the inflow was unequal to the outflow (i.e., was the "N" branch taken from step 701 for any of the analyzed blocks?) It will be observed that it is possible that mismatches were detected, and yet the mismatch stacks are empty. In this case, there will be nothing to process on the mismatch stacks (step 505), but there still may be suspicious paths to adjust (step 506).

FIG. 9 is a flow diagram showing in expanded form the processing of the mismatch stacks (i.e., the zero-mismatch and zero-join-mismatch stacks), represented in FIG. 5 as step 505. Referring to FIG. 9, if the zero-mismatch stack in non-empty, the "N" branch is taken from step 901 and a block from the top of the stack (designated block B) is popped from the zero-mismatch stack (step 905). Since block B is on the zero-mismatch stack, it is known that either the inflow to B is zero, or the outflow from B is zero, but not both. If the inflow to B is zero, the "Y" branch is taken from step 906. The arc weight adjustment algorithm then adjusts any non-zero outflow arcs to zero and analyzes the affected successor nodes (represented in FIG. 9 as step 907, and shown in greater detail in FIG. 10). If the inflow is not zero (i.e., the outflow must be zero), the "N" branch is taken from step 906. The arc weight adjustment algorithm then adjusts any non-zero inflow arcs to zero and analyzes the affected predecessor nodes (represented in FIG. 9 as step 908, and shown in greater detail in FIG. 11). After performing step 907 or 908 (as is the case), the algorithm returns to step 901 to again examine the stacks. It may be noted here that the analysis of successors and predecessors as shown in FIGS. 10 and 11 may cause additional blocks to be placed on the zero-mismatch or zero-join-mismatch stacks.

If, at step 901, the zero-mismatch stack is empty, the "Y" branch is taken, and the arc weight adjustment algorithm looks at the zero-join-mismatch stack. If the zero-join-mismatch stack is non-empty, the "N" branch is taken from step 902, and a block B is popped from the top of the stack (step 903). The algorithm then sets the offending arc to zero, and analyzes affecting neighboring nodes (represented in FIG. 9 as step 904, and shown in greater detail in FIG. 12). After performing step 904, the algorithm returns to step 901 to again examine the stacks. As in the case of steps 907 and 908, the analysis represented by step 904 may cause additional blocks to be placed on the zero-mismatch or zero-join-mismatch stacks.

This process continues in a recursive fashion until both stacks have been emptied. When both are empty, the "Y" branch will be taken from step 902, and the processing of the mismatch stacks is finished.

Figure 10:
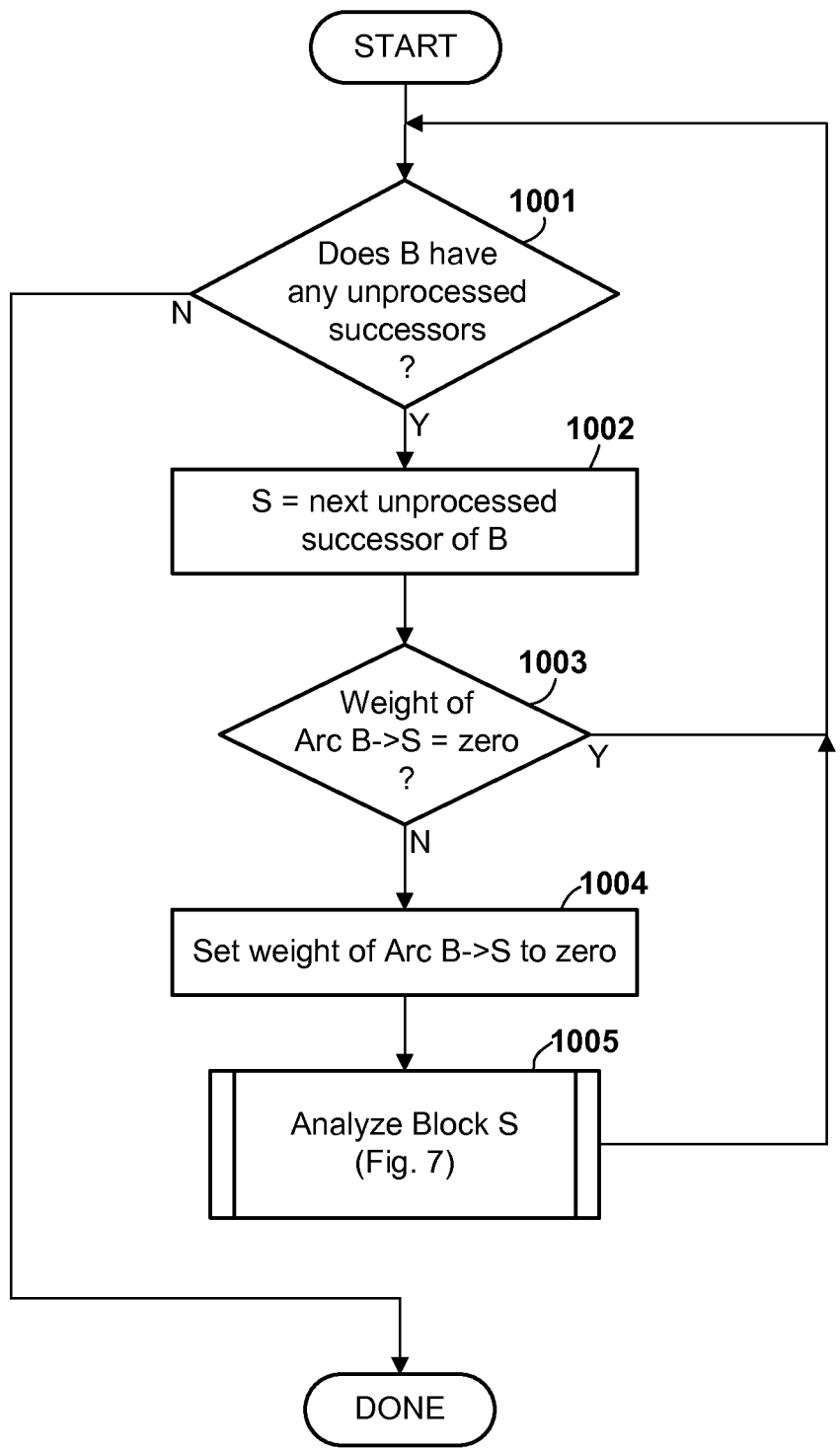
FIG. 10 is a flow diagram showing in expanded form the adjusting of arc weights and analysis of successor nodes in the case of a zero-mismatch in which the inflow is zero, within the process of FIG. 9, according to the preferred embodiment.
Figure 11:
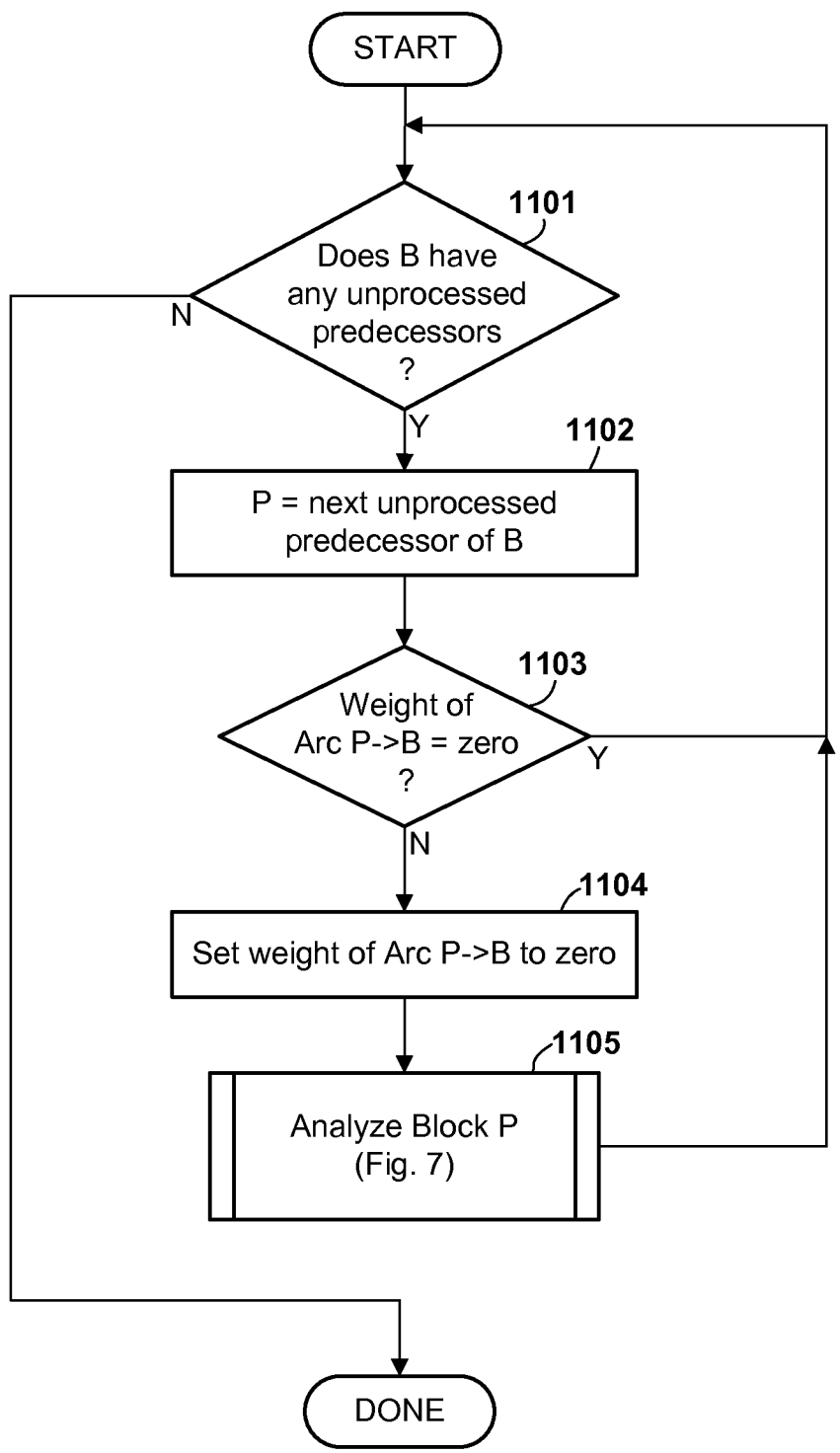
FIG. 11 is a flow diagram showing in expanded form the adjusting of arc weights and analysis of predecessor nodes in the case of a zero-mismatch in which the outflow is zero, within the process of FIG. 9, according to the preferred embodiment.

FIG. 10 is a flow diagram showing in expanded form the adjusting of arc weights and analysis of successor nodes in the case of a zero-mismatch in which the inflow is zero, represented in FIG. 9 as step 907. Referring to FIG. 10, the arc weight adjustment function determines whether any arcs directed from block B to another node (a "successor") are unprocessed (step 1001). If so, the "Y" branch is taken, and the next unprocessed successor node (designated "S") is selected (step 1002). If the weight of the arc from block B to block S (Arc B→S) is already zero, then nothing more needs to be done with this arc or with successor node S, so the "Y" branch is taken from step 1003 to return to step 1001. If the weight of arc B→S is non-zero, the "N" branch is taken from step 1003, and the weight of arc B→S is adjusted to zero (step 1004). As explained previously, since block B represents a zero-mismatch, and zero weight arcs are regarded as more reliable than non-zeroes, all arcs out of block B are set to zero.

The change in arc weight of arc B→S might cause a mismatch in block S, which would cause block S to be placed on either the zero-mismatch or the zero-join-mismatch stack. Therefore, block S is analyzed for mismatches (step 1005). The procedure used to analyze block S is the same as that used for block B and described above with respect to FIG. 7 (and included FIG. 8). When block S has been analyzed, the algorithm returns to step 1001. When all successors of B have thus been processed, the "N" branch is taken from step 1001, and the process of analyzing successors (represented in FIG. 9 as step 907) is finished.

FIG. 11 is a flow diagram showing in expanded form the adjusting of arc weights and analysis of predecessor nodes in the case of a zero-mismatch in which the outflow is zero, represented in FIG. 9 as step 908. Referring to FIG. 11, the arc weight adjustment function determines whether any arcs directed into block B from another node (a "predecessor") are unprocessed (step 1101). If so, the "Y" branch is taken, and the next unprocessed predecessor node (designated "P") is selected (step 1102). If the weight of the arc from block P to block B (Arc P→B) is already zero, then nothing more needs to be done with this arc or with predecessor node P, so the "Y" branch is taken from step 1103 to return to step 1101. If the weight of arc P→B is non-zero, the "N" branch is taken from step 1103, and the weight of arc P→B is adjusted to zero (step 1104). As explained previously, since block B represents a zero-mismatch, and zero weight arcs are regarded as more reliable than non-zeroes, all arcs into block B are set to zero.

The change in arc weight of arc P→B might cause a mismatch in block P, which would cause block P to be placed on either the zero-mismatch or the zero-join-mismatch stack. Therefore, block P is analyzed for mismatches (step 1105). The procedure used to analyze block P is the same as that used for block B and described above with respect to FIG. 7 (and included FIG. 8). When block P has been analyzed, the algorithm returns to step 1101. When all predecessors of B have thus been processed, the "N" branch is taken from step 1101, and the process of analyzing predecessors (represented in FIG. 9 as step 908) is finished.

Figure 12:
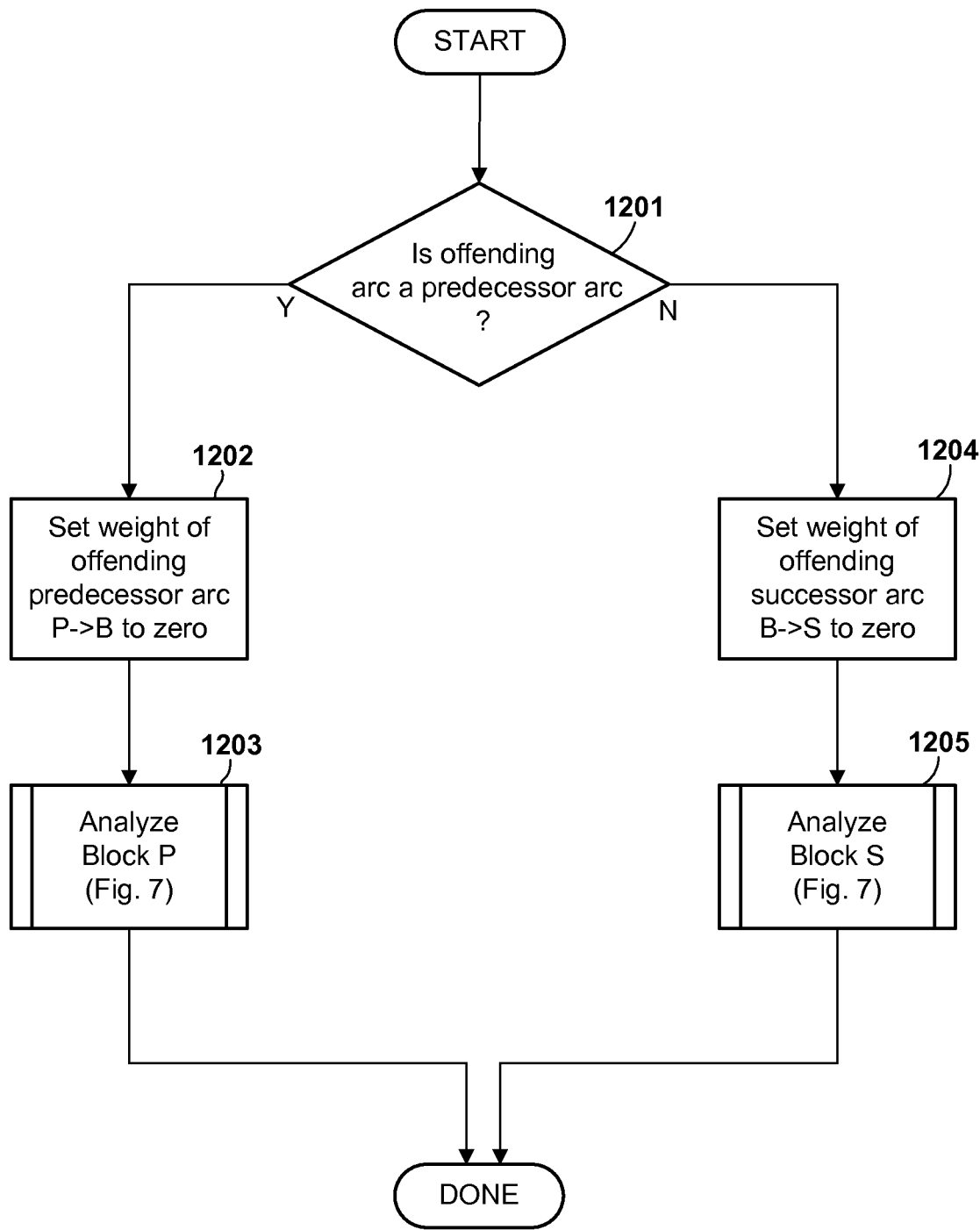
FIG. 12 is a flow diagram showing in expanded form the adjusting of arc weight of an offending arc and analysis of affected neighbor nodes in the case of a zero-join-mismatch, within the process of FIG. 9, according to the preferred embodiment.

FIG. 12 is a flow diagram showing in expanded form the adjusting of arc weight of an offending arc and analysis of affected neighbor node in the case of a zero-join-mismatch, represented in FIG. 9 as step 904. Referring to FIG. 12, the arc weight adjustment function determines whether the "offending" arc is a predecessor arc (step 1201). It will be recalled that, according to the definition of a zero-join-mismatch, there will be one and only one arc which exactly equals the amount of the arc weight mismatch between inflow and outflow; this arc is termed the "offending" arc. If the offending arc is a predecessor arc, the "Y" branch is taken from step 1201, and the weight of the offending arc is set to zero (step 1202). The change in arc weight of arc P→B might cause a mismatch in block P, the predecessor block connected to the offending arc, which would cause block P to be placed on either the zero-mismatch or the zero-join-mismatch stack. Therefore, block P is analyzed for mismatches (step 1203). The procedure used to analyze block P is the same as that used for block B and described above with respect to FIG. 7 (and included FIG. 8). When block P has been analyzed, the processing of the offending arc is finished.

If, at step 1201, the offending arc is a successor arc, the "N" branch is taken from step 1201, and the weight of the offending arc is set to zero (step 1204). The change in arc weight of arc B→S might cause a mismatch in block S, the successor block connected to the offending arc, which would cause block S to be placed on either the zero-mismatch or the zero-join-mismatch stack. Therefore, block S is analyzed for mismatches (step 1205). The procedure used to analyze block S is the same as that used for block B and described above with respect to FIG. 7 (and included FIG. 8). When block S has been analyzed, the processing of the offending arc is finished.

Referring again to FIG. 9, it will be observed that, if a successor S or predecessor P to block B was placed on a stack by the analysis of block S or P triggered in the procedures of FIG. 10, 11 or 12 (steps 907, 908 or 904), then the algorithm will eventually pop the added block S or P from one or the other of the stacks (at step 903 or 905) and may then adjust additional arc weights and place additional nodes connected to S or P on the stack. Thus, the process of adjusting mismatches continues recursively until it is no longer possible to identify a suitable adjustment. When this happens, the stacks will be empty and the "Y" branch will be taken from step 902, which will complete the processing of the mismatch stacks.

Figure 13:
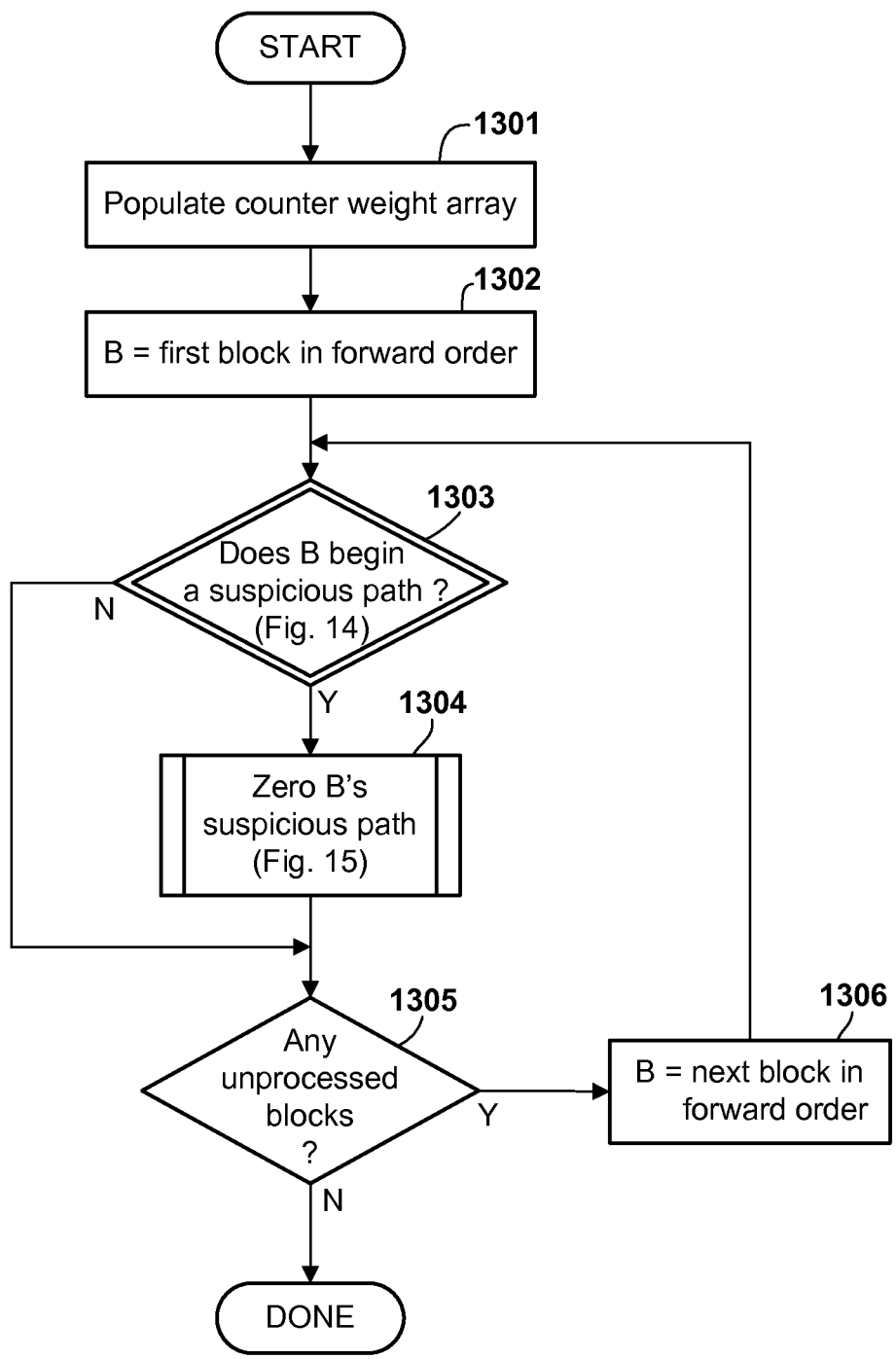
FIG. 13 is a flow diagram showing in expanded form the processing of suspicious paths, within the process of FIG. 5, according to the preferred embodiment.

Referring again to FIG. 5, after all the mismatch stacks have been processed as described above with reference to FIGS. 9-12, there remains one heuristic to apply. The arc weight adjustment function then processes "suspicious paths" (step 506), as shown in FIG. 13. Strictly speaking, a "suspicious path" does not necessarily involve a mismatch at the nodes under consideration and would not have been detected by the earlier procedures, although it is likely to be the result of a counter contention error. A suspicious path is a chain of arcs meeting certain conditions, among which are that the arcs have identical non-zero weight through a series of nodes having no other non-zero weight arcs. FIG. 16C shows an example of a suspicious path.

FIG. 13 is a flow diagram showing in expanded form the processing of suspicious paths, represented in FIG. 5 as step 506. Referring to FIG. 13, the arc weight adjustment algorithm first populates an array of measured counter weight values (step 1301). I.e., there is an array element corresponding to each unique counter value in the counters 213 which measure the number of times respective corresponding paths were taken during execution. This array is used as described further herein. The algorithm then selects a first block B in a forward ordering (step 1302). I.e., the blocks are assigned a forward order using the well-known technique of depth first ordering, and blocks are selected in that order.

The arc weight adjustment algorithm then determines whether the selected block B is at the beginning of a "suspicious path". This decision is represented in FIG. 13 as step 1303, and shown in greater detail in FIG. 14.

Figure 14:
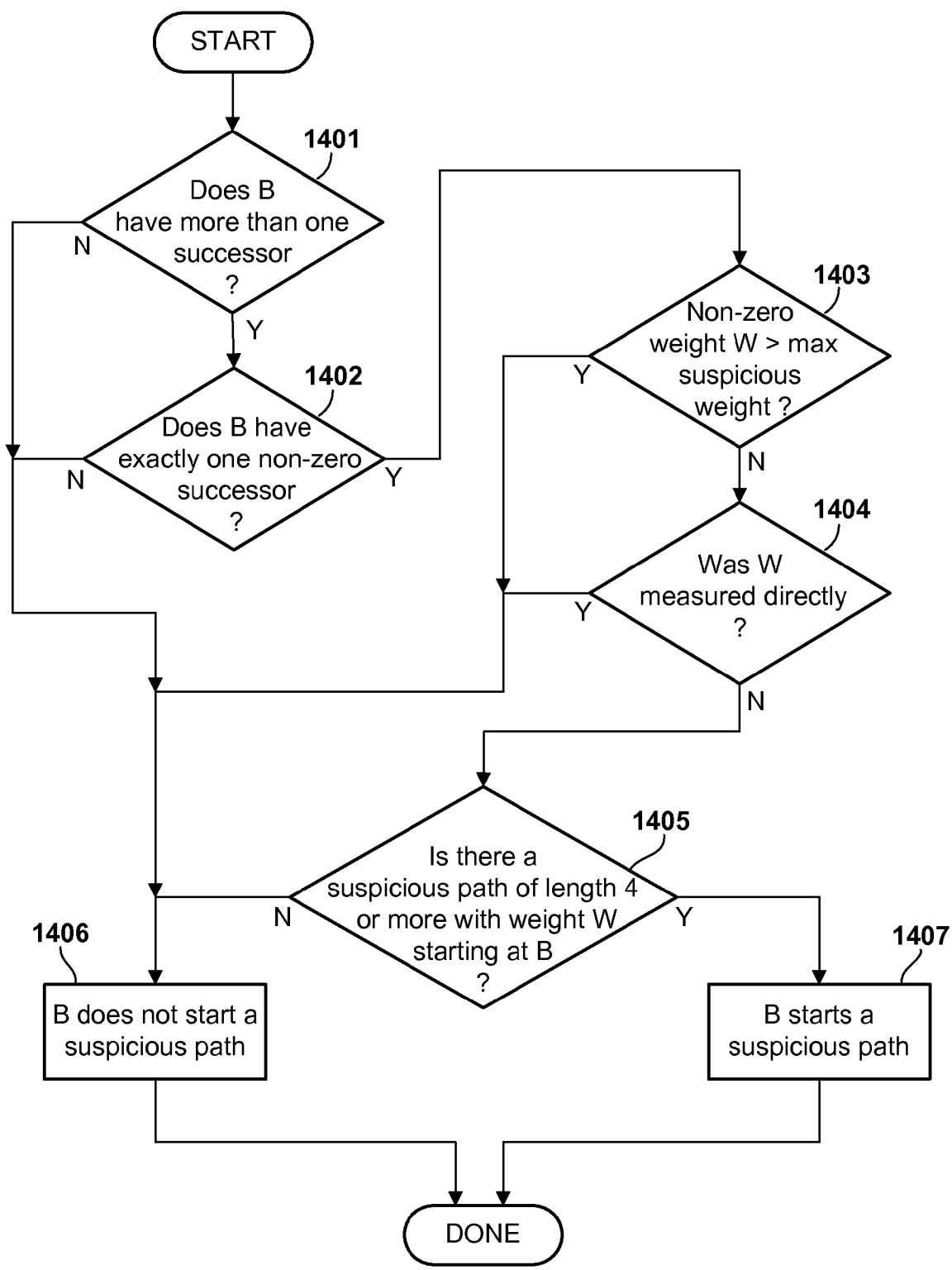
FIG. 14 is a flow diagram showing in expanded form the process of determining whether a set of connected nodes and arcs should be considered a "suspicious path", within the process of FIG. 13, according to the preferred embodiment.

FIG. 14 is a flow diagram showing in expanded form the process of determining whether a set of connected nodes and arcs beginning with a selected block B should be considered a "suspicious path", represented in FIG. 13 as step 1303. If selected block B has only one successor, i.e., has only one arc out of block B, the "N" branch from step 1401 is taken to step 1406, and B is not considered the start of a suspicious path. Otherwise the algorithm considers whether B has one and only one non-zero successor (step 1402). If B has no arcs leading out of it which are non-zero, or if it has more than one non-zero arc, the "N" branch is taken from step 1402 to step 1406, and B is not considered the start of a suspicious path. If B has exactly one non-zero successor, the algorithm continues to step 1403. Since a suspicious path is one in which there are multiple outgoing arcs from the nodes, but only one value gets propagated down a chain of nodes, the first two tests of steps 1401 and 1402 are designed to eliminate cases which do not fit this pattern.

If both conditions of steps 1401 and 1402 are met, the "Y" branch of step 1402 is taken to step 1403. If the weight (W) of the single non-zero arc leading out of block B is greater than a maximum suspicious weight threshold, then the "Y" branch is taken from step 1403 to step 1406, and B is not considered the start of a suspicious path. The reason for this test is that errors resulting from counter contention are generally small, so if W is sufficiently large it is unlikely to have been the result of an error in counter contention. In the preferred embodiment, the maximum suspicious weight threshold is one-half percent (0.5%) of the total weight of input at the entry point of the procedure containing block B.

If W does not exceed the max suspicious weight threshold, the "N" branch is taken from step 1403 to step 1404. The algorithm compares W to the values in the array of measured counter weights which was initialized at step 1301. If W matches any value in the array, it is assumed that W is a directly measured value. In this case, the "Y" branch is taken from step 1404 to step 1406, and B is not considered the start of a suspicious path. The reason for this test is to avoid "correcting" paths that are already correct. If a value appears many times in a row along a sequence of arcs, then it would be very unlucky indeed never to have measured that value directly, if the value is correct, and for this reason an unmeasured repeated value is considered suspicious. However, if that value has been directly measured, then it is more likely that this is a sequence of arcs that happens always to be traversed based on the given input data. Therefore a repeated value that was directly measured is not considered suspicious. It is, of course, possible that a count equal to W was measured at an unrelated arc, and by coincidence the non-zero arc exiting block B has the same weight. However, for sufficiently large sample data and counter values, this is unlikely.

If W does not equal any value in the array, the "N" branch is taken from step 1404 to step 1405. The algorithm then looks for a chain of at least 4 nodes, starting with block B and following the non-zero arc exiting block B, which all have an outgoing arc with a weight of W, where all other arcs out of the nodes have a weight of zero. In counting the nodes in such a chain to 4, any node having only one outgoing arc of weight W and no other outgoing arcs does not increment the count, but it also does not break the chain. E.g., a chain of 5 nodes, having a single node in the middle which has only one outgoing arc, the weight of that arc being W, where the other 4 nodes satisfy the requirements stated above, is also considered a suspicious path. If such a chain exists, then the "Y" branch is taken from step 1405 to step 1407, and B is considered the start of a suspicious path; otherwise the "N" branch is taken to step 1406, and B is not considered the start of a suspicious path. The chain of nodes 1621, 1622, 1623 and 1624 of FIG. 16C is an example of a suspicious path, node 1621 being the beginning of the path.

Referring again to FIG. 13, if it is determined that B begins a suspicious path, the "Y" branch is taken from step 1303, and the adjustment algorithm adjusts weights in the suspicious path by converting arcs of weight W to zero. This process is represented in FIG. 13 as step 1304, and shown in greater detail in FIG. 15. If, at step 1303, it is determined that B does not begin a suspicious path, the "N" branch from step 1303 is taken and step 1304 is by-passed.

Figure 15:
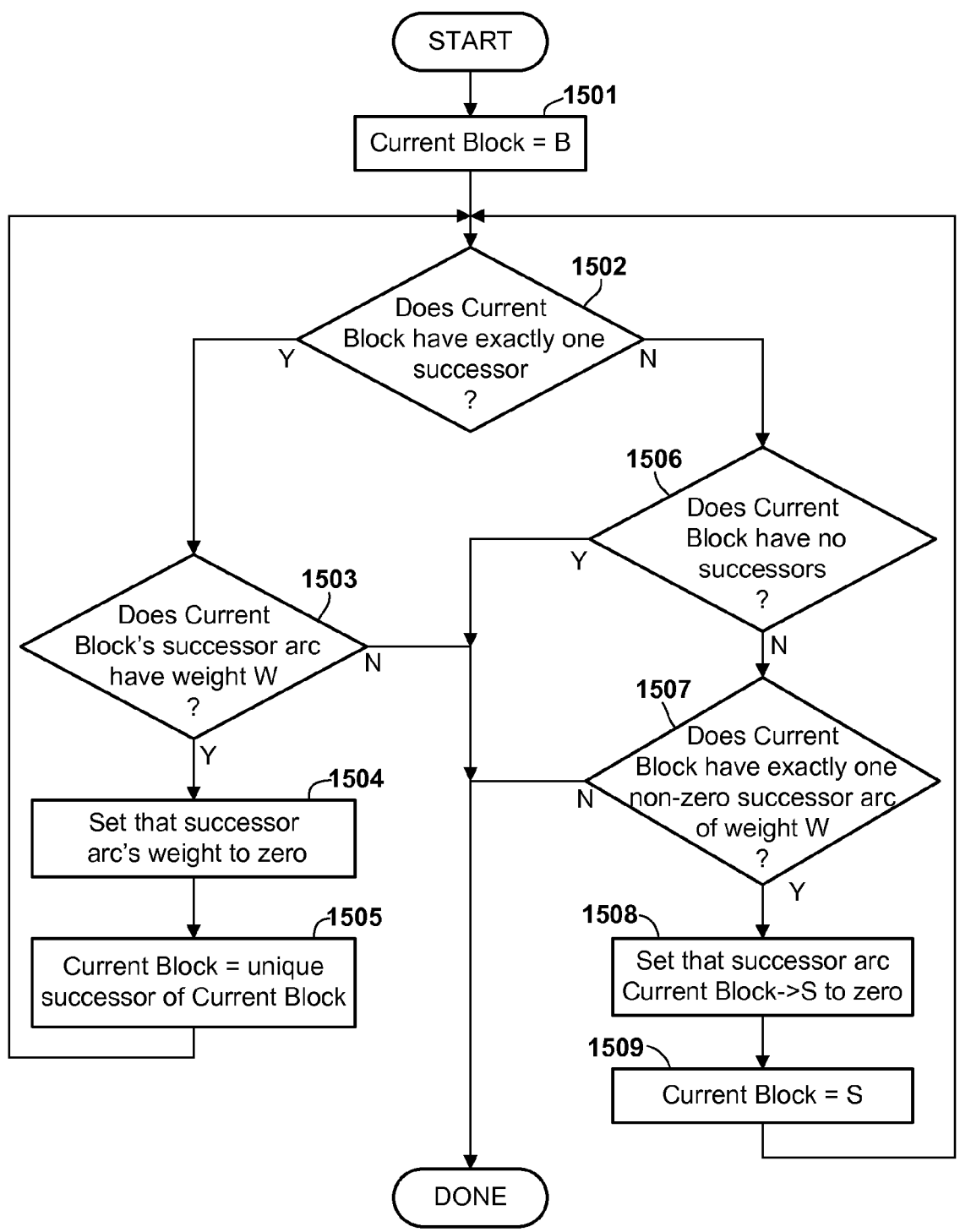
FIG. 15 is a flow diagram showing in expanded form the process of adjusting the arc weights in a "suspicious path", within the process of FIG. 13, according to the preferred embodiment.

FIG. 15 is a flow diagram showing in expanded form the process of adjusting the arc weights in a "suspicious path", represented in FIG. 13 as step 1304. Initially, the Current Block is set to the selected block B which was earlier determined to be the start of a suspicious path (step 1501). If the Current Block has exactly one successor, i.e., has one and only one arc exiting the Current Block, the "Y" branch from step 1502 is taken to step 1503. The adjustment algorithm then determines whether the single arc exiting the Current Block has a weight of W (step 1503). If the weight of this arc is not W, then the end of the suspicious path has been reached, and the "N" branch is taken from step 1503. If the weight of this arc is W, then the "Y" branch is taken from step 1503. In this case, the weight of this arc is set to zero (step 1504), and the Current Block is set to the successor of the Current Block, i.e., the block at the end of the arc of which the weight was just changed to zero (step 1505). The algorithm then returns to step 1502 to process the new Current Block.

If, at step 1502, the Current Block does not have exactly one successor, the "N" branch is taken to step 1506. If the Current Block has no successors (no arcs exiting the Current Block), then the end of the suspicious path has been reached, and the "Y" branch is taken from step 1506. If the Current Block has successors, the "N" branch is taken from step 1506 to step 1507. The algorithm then determines whether the Current Block has exactly one non-zero successor arc of weight W (step 1507). I.e., if the Current Block has no non-zero successors, or has more than one non-zero successor, or has only one non-zero successor, but its weight is not W, then the end of the suspicious path has been reached, and the "N" branch is taken from step 1507. If there is exactly one non-zero successor and it has a weight of W, the "Y" branch is taken from step 1507. In this case, the weight of the non-zero arc exiting the Current Block is set to zero (step 1508), and the Current Block is set equal to the block at the end of the arc which was just set to zero (step 1509). The algorithm then returns to step 1502 to process the new Current Block.

At some point, a condition will be reached signaling the end of the "suspicious path", and the processing of the suspicious path (indicated as step 1304) will be complete. The fact that the "end" of a suspicious path has been reached merely means that the heuristic will not attempt to further correct the arc weights, and does not mean that all arc weights have now been corrected. The heuristic only corrects arc weights for which there is some good level of confidence that the weight should be zero. When a new condition is encountered (e.g., multiple non-zero arcs exiting a node), it becomes difficult to say with confidence where the error lies, and therefore the process of adjusting weights along a suspicious path ends.

Referring again to FIG. 13, after block B has been processed as indicated at steps 1303 and 1304, the adjustment algorithm determines whether there are any unprocessed blocks (step 1305). If so, the "Y" branch is taken, and a block B is selected, being the next block in the forward order (step 1306). The algorithm then returns to step 1303 to process the newly selected block B. When all blocks have been processed, the "N" branch is taken from step 1305 and the processing of suspicious paths is finished. This completes the adjustment of arc weights.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 1 as system memory 102, and as data storage devices 125-127.

In accordance with the preferred embodiment, an arc weight adjustment method having three separate heuristics for adjusting and correcting arc weights after the measuring and inferencing processes is described in some detail. However, it will be understood that many variations in the implementation of an arc weight adjustment algorithm are possible within the scope of the present invention. The correcting of arc weights in accordance with the present invention could be practiced with other or additional heuristics or techniques, or using fewer than all of these heuristics, or using none of the described heuristics but using other heuristics or techniques in their place. Additionally, any of the described heuristics may be modified by changing any of various parameters or method steps to alter the conditions which trigger adjustment of arc weights.

In the preferred embodiment, the arc weight adjustment function is described as part of a compiler or compilation process. However, it would alternatively be possible to analyze profile data and correct arc weights in accordance with the present invention independently of any compilation process or compiler program.

Although a specific embodiment of the invention has been disclosed along with certain alternatives, it will be recognized by those skilled in the art that additional variations in form and detail may be made within the scope of the following claims:

What is claimed is:

1. A compiler for producing optimized computer programming code, said compiler embodied as a plurality of computer-executable instructions recorded on a non-transitory tangible computer-readable medium, said compiler comprising:

an instrumentation function which places instrumentation hooks in a subset of respective paths in a first compiled version of a computer program, each instrumentation hook generating profile data during execution of said first compiled version of said computer program representing control flow in the respective path of the instrumentation hook to produce measured profile data, said subset of respective paths being fewer than all potential paths of said first compiled version of said computer program;

an inferencing function, said inferencing function inferring profile data for control flow paths in said first compiled version of said computer program which are not in said subset to produce inferred profile data from said measured profile data; and a profile data adjustment function which uses at least one first heuristic to identify at least one error in profile data for at least one path in said first compiled version of said computer program inferred by said inferencing function and adjusts said error according to at least one second heuristic to produce adjusted inferred profile data from said measured profile data and said inferred profile data;

wherein said compiler uses said measured profile data produced by said instrumentation hooks, said inferred profile data produced by said inferencing function, and said adjusted inferred profile data produced by said profile data adjustment function to generate an optimized version of said computer program.

2. The compiler of claim 1, wherein said compiler is a back-end compiler which transforms code in an intermediate representation to compiled executable code.

3. The compiler of claim 1, wherein each said instrumentation hook placed in said first compiled version of said computer program by said instrumentation function causes a respective counter to be incremented whenever the path in which the hook is placed is traversed during program execution.

4. The compiler of claim 1, wherein said profile data adjustment function detects at least one block of code of said first compiled version of said computer program for which a sum of path values of input paths is unequal to a sum of path values of output paths, and adjusts at least one of the path values of an input path to the block of code or an output path from the block of code.

5. The compiler of claim 4, wherein said profile data adjustment function identifies as erroneous a non-zero path value for a first block of code for which one and only one of the following is true: (a) the sum of the path values of the input paths to the first block of code is zero and the sum of the path values of the output paths from the first block of code is non-zero, or (b) the sum of the path values of the input paths to the first block of code is non-zero and the sum of the path values of the output paths from the first block of code is zero.

6. The compiler of claim 4, wherein said profile data adjustment function identifies as erroneous a path value of a first path for a first block of code for which one and only one of the following is true: (a) the sum of the path values of the input paths to the first block of code is greater than the sum of the path values of the output paths from the first block of code, and the first path is an input path having a path value equal to a difference between the sum of the path values of the input paths to the first block of code and the sum of the path values of the output paths from the first block of code, or (b) the sum of the path values of the input paths to the first block of code is less than the sum of the path values of the output paths from the first block of code, and the first path is an output path having a path value equal to the difference between the sum of the path values of the output paths from the first block of code and the sum of the path values of the input paths to the first block of code.

7. The compiler of claim 1, wherein said profile data adjustment function identifies as erroneous profile data associated with a first plurality of blocks of code, each block of the first plurality of blocks having respective multiple output paths, wherein the blocks of the first plurality of blocks are connected by a successive chain of paths, wherein each path of said successive chain of paths has the same path value, and wherein each output path from each block of said set of nodes, other than the outgoing arcs in said successive chain of arcs, has a weight of zero.

8. The compiler of claim 1, wherein said profile data adjustment function uses a plurality of different heuristics to identify respective different errors in the profile data.

* * * * *